US011785121B2

United States Patent

(12) United States Patent
Cao et al.
(10) Patent No.: US 11,785,121 B2
(45) Date of Patent: Oct. 10, 2023

(54) SELECTING PROTOCOL ADAPTOR IN A COMMUNICATION NETWORK

(71) Applicant: HUAWEI TECHNOLOGIES CO., LTD., Guangdong (CN)

(72) Inventors: Longyu Cao, Shanghai (CN); Yaoguang Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/568,473

(22) Filed: Jan. 4, 2022

(65) Prior Publication Data

US 2022/0131958 A1 Apr. 28, 2022

Related U.S. Application Data

(63) Continuation of application No. PCT/CN2020/102841, filed on Jul. 17, 2020.

(30) Foreign Application Priority Data

Jul. 26, 2019 (CN) ........................ 201910683991.0

(51) Int. Cl.
*H04L 69/18* (2022.01)
*H04L 41/08* (2022.01)
(Continued)

(52) U.S. Cl.
CPC .......... *H04L 69/18* (2013.01); *H04L 41/0226* (2013.01); *H04L 41/04* (2013.01);
(Continued)

(58) Field of Classification Search
CPC ............ H04L 41/0226; H04L 41/0233; H04L 41/0273; H04L 41/04; H04L 41/08;
(Continued)

(56) References Cited

U.S. PATENT DOCUMENTS 6,959,307 B2 * 10/2005 Apte ....................... G06F 9/548
7,127,517 B2 10/2006 Heisig et al.
(Continued)

FOREIGN PATENT DOCUMENTS

CN 1744594 A 3/2006
CN 102790781 A 11/2012
(Continued)

OTHER PUBLICATIONS

3GPP TR 28.890 V16.0.0 (Mar. 2019), "3rd Generation Partnership Project;Technical Specification Group Services and System Aspects; Management and orchesstation; Study on integration of Open Network Automation Platform (ONAP) and Management for SG networks (Release 16)," 46 pages.
(Continued)

*Primary Examiner* — Thomas J Dailey
(74) *Attorney, Agent, or Firm* — Fish & Richardson P.C.

(57) ABSTRACT

Example communication methods and example apparatuses are provided. One example method includes obtaining, by an adaptor client, a southbound interface protocol type, where the adaptor client manages two or more protocol adaptors. The adaptor client can then select a first protocol adaptor from the two or more protocol adaptors based on the southbound interface protocol type, where the first protocol adaptor implements a first protocol.

20 Claims, 19 Drawing Sheets

(51) Int. Cl.

| | |
|---|---|
| ***H04L 41/0803*** | (2022.01) |
| ***H04L 41/0226*** | (2022.01) |
| ***H04L 41/04*** | (2022.01) |
| ***H04L 41/14*** | (2022.01) |
| ***H04L 41/0273*** | (2022.01) |
| ***H04L 41/0233*** | (2022.01) |
| ***H04L 67/02*** | (2022.01) |

(52) U.S. Cl.
CPC .......... *H04L 41/08* (2013.01); *H04L 41/0803* (2013.01); *H04L 41/145* (2013.01); *H04L 41/0233* (2013.01); *H04L 41/0273* (2013.01); *H04L 67/02* (2013.01)

(58) Field of Classification Search
CPC ... H04L 41/0803; H04L 41/145; H04L 67/02; H04L 69/18
See application file for complete search history.

(56) References Cited

U.S. PATENT DOCUMENTS

| | | | | |
|---|---|---|---|---|
| 7,376,958 | B1 * | 5/2008 | Klingman | G06F 9/541 719/330 |
| 8,019,839 | B2 * | 9/2011 | Lopes | G06F 9/541 709/227 |
| 8,516,094 | B2 * | 8/2013 | Yang | H04L 41/052 709/226 |
| 9,374,269 | B2 * | 6/2016 | Hirsch | H04L 41/046 |
| 2006/0015617 | A1 * | 1/2006 | Castro | H04Q 3/0062 709/226 |
| 2016/0127514 | A1 | 5/2016 | Maksumov et al. | |
| 2016/0315802 | A1 * | 10/2016 | Wei | H04L 67/55 |
| 2019/0245740 | A1 * | 8/2019 | Kachhla | H04L 41/04 |

FOREIGN PATENT DOCUMENTS

| | | | |
|---|---|---|---|
| CN | 103181119 | A | 6/2013 |
| CN | 106302071 | A | 1/2017 |
| CN | 106484611 | A | 3/2017 |
| CN | 108667547 | A | 10/2018 |
| CN | 109889521 | A | 6/2019 |
| EP | 1551129 | A2 | 7/2005 |
| WO | 2013169156 | A1 | 11/2013 |

OTHER PUBLICATIONS

3GPP TS 32.391 V15.0.0 (Jun. 2018), "3rd Generation Partnership Project; Technical Specification Group Services and System Aspects; Telecommunication management; Delta Synchronization Integration Reference Point (IRP); Requirements (Release 15)," Jun. 2018, 10 pages.
Extended European Search Report issued in European Application No. 20847384.3 dated Jul. 13, 2022, 12 pages.
Office Action issued in Chinese Application No. 201910683991.0 dated Jun. 28, 2021, 13 pages (with English translation).
PCT International Search Report and Written Opinion issued in International Application No. 12 dated Oct. 23, 2020, 12 pages (partial English translation).

* cited by examiner

SELECTING PROTOCOL ADAPTOR IN A COMMUNICATION NETWORK

CROSS-REFERENCE TO RELATED APPLICATIONS

This application is a continuation of International Application No. PCT/CN2020/102841, filed on Jul. 17, 2020, which claims priority to Chinese Patent Application No. 201910683991.0, filed on Jul. 26, 2019. The disclosures of the aforementioned applications are hereby incorporated by reference in their entireties.

TECHNICAL FIELD

This application relates to the field of communication technologies, and in particular, to a communication method and an apparatus.

BACKGROUND

A configuration management basis of the 3rd generation partnership project (3GPP) is a network resource managed object (MO). Currently, a network resource model (NRM) modeling method and a MO type are defined in the 3GPP standard for different radio network elements (such as a base station). Configuration parameters sent by a network management system (NMS) to an element management system (EMS) or a network element (NE) are encapsulated and sent based on a MO. The configuration management is a series of operations on NRM MOs to set related network parameters (such as create MOs) for a network element and maintain and manage a deployed network element, for example, modify the configuration parameters (modify MOs) and query (MOs and MO attributes). Currently, the 3GPP standard defines: configuration management (CM) of an Itf-N interface between the NMS and the EMS supports a common object request broker architecture (CORBA), a simple object access protocol (SOAP) and REST representational state transfer (RESTful) protocol processing.

To build a unified network management infrastructure (open network automation platform (ONAP)+3GPP services & systems aspects (SA) 5), the ONAP needs to support a 3GPP-defined standard interface and an NRM modeling mechanism to implement network configuration management. However, currently, an ONAP southbound interface does not support the CORBA, the SOAP, and the RESTful protocol processing that are supported by the Itf-N interface and that are defined in the current 3GPP standard. In this case, to construct the unified network management infrastructure (ONAP+3GPP SA5), integration of the ONAP and 3GPP service management cannot be implemented.

SUMMARY

This application provides a communication method and an apparatus, to select an appropriate adaptor to implement that an ONAP adapts to a 3GPP configuration management function. Therefore, integration of the ONAP and 3GPP service management can be implemented.

According to a first aspect, this application provides a communication method, and the method may include: An adaptor client obtains a southbound interface protocol type, and selects a first protocol adaptor from two or more protocol adaptors based on the southbound interface protocol type. The adaptor client is configured to manage the two or more protocol adaptors. The first protocol adaptor is configured to implement a first protocol.

According to the foregoing method, to implement that an ONAP adapts to a 3GPP configuration management function, when an interface adaptor (for example, a CORBA adaptor, a SOAP adaptor, and a RESTful adaptor) that adapts to a 3GPP configuration management protocol is added to a southbound interface of the ONAP, an appropriate adaptor can be flexibly selected by the adaptor client. Therefore, integration of the ONAP and 3GPP service management can be implemented.

In a possible design, a specific method of that an adaptor client obtains a southbound interface protocol type may be as follows: The adaptor client receives first information from a service orchestrator, where the first information is used to request to perform network configuration for a first network element. The first information is a configuration parameter in a key-value pair form. The first information includes the southbound interface protocol type. The adaptor client obtains the southbound interface protocol type from the first information. Alternatively, the adaptor client obtains the preset southbound interface protocol type.

According to the foregoing method, the adaptor client can accurately obtain the southbound interface protocol type, so that an appropriate protocol adaptor can be selected subsequently.

In a possible design, that the adaptor client receives first information from a service orchestrator may be specifically as follows: The adaptor client receives, from the service orchestrator, the first information sent by the service orchestrator by invoking a first interface. The first interface is provided by the adaptor client. The first interface may reuse an existing interface, or may be a newly defined interface.

According to the foregoing method, the adaptor client can accurately receive the first information from the service orchestrator.

In a possible design, after receiving the first information from the service orchestrator, the adaptor client may further perform the following operation: The adaptor client sends the first information to the first protocol adaptor. Alternatively, the adaptor client determines second information based on the first information, and sends the second information to the first protocol adaptor, where the second information is a managed object and an object attribute thereof. The second information is obtained by mapping the first information based on a network resource managed object template.

According to the foregoing method, the first protocol adaptor may be subsequently enabled to perform network resource managed object template mapping by using the first information, or the adaptor client directly sends the converted second information to the first protocol adaptor.

In a possible design, when the adaptor client sends the first information to the first protocol adaptor, a specific method may be as follows: The adaptor client invokes a second interface provided by the first protocol adaptor to send the first information to the first protocol adaptor. When the adaptor client sends the second information to the first protocol adaptor, a specific method may be as follows: The adaptor client invokes the second interface provided by the first protocol adaptor to send the second information to the first protocol adaptor. The second interface may reuse an existing interface, or may be a newly defined interface.

According to the foregoing method, the adaptor client can accurately send corresponding information to the first protocol adaptor.

In a possible design, the adaptor client sends a network resource model template query request to the first network element, and receives a network resource object model of the first network element from the first network element. In this way, the adaptor client may be subsequently enabled to perform network resource managed object template mapping.

In a possible design, the adaptor client receives third information from the first protocol adaptor, where the third information includes a name, an identifier, and a supported protocol type of the first protocol adaptor. The adaptor client creates context information locally on the adaptor client based on the third information. The adaptor client sends fourth information to the first protocol adaptor, where the fourth information is used to indicate a registration result to the first protocol adaptor.

According to the foregoing method, the adaptor client can accurately manage the first protocol adaptor, to accurately select the first protocol adaptor as an appropriate protocol adaptor for the current service.

In a possible design, the first protocol adaptor may be a CORBA adaptor, a SOAP adaptor, a RESTful adaptor, or the like.

According to a second aspect, this application provides a communication method, and the method may include: A first protocol adaptor receives first information and determines second information based on the first information, and then sends the second information to a first network element. The first information is a configuration parameter in a key-value pair form. The first information is a configuration parameter used to perform network configuration for the first network element. The first protocol adaptor is configured to implement a first protocol. The second information is a managed object and an object attribute thereof. The second information is obtained by mapping the first information based on a network resource managed object template. According to the foregoing method, integration of an ONAP and 3GPP service management can be implemented.

In a possible design, that a first protocol adaptor receives first information may be as follows: The first protocol adaptor receives the first information from an adaptor client, where the adaptor client is configured to manage two or more protocol adaptors. Alternatively, the first protocol adaptor receives the first information from a service orchestrator.

According to the foregoing method, the first protocol adaptor can accurately obtain the first information.

In a possible design, when the first protocol adaptor receives the first information from the adaptor client, a specific method may be as follows: The first protocol adaptor receives the first information sent by the adaptor client by invoking a second interface, where the second interface is provided by the first protocol adaptor. When the first protocol adaptor receives the first information from the service orchestrator, a specific method may be as follows: The first protocol adaptor receives the first information sent by the service orchestrator by invoking the second interface. The second interface may reuse an existing interface, or may be a newly defined interface.

According to the foregoing method, the first protocol adaptor can accurately obtain the first information.

In a possible design, the first protocol adaptor sends a network resource model template query request to the first network element, and receives a network resource object model of the first network element from the first network element. In this way, the first protocol adaptor may be subsequently enabled to perform network resource managed object template mapping.

In a possible design, the first protocol adaptor sends third information to the adaptor client, where the third information includes a name, an identifier, and a supported protocol type of the first protocol adaptor. The first protocol adaptor receives fourth information from the adaptor client, where the fourth information is used to indicate a registration result to the first protocol adaptor.

According to the foregoing method, the adaptor client may be enabled to accurately manage the first protocol adaptor, and subsequently, to accurately select the first protocol adaptor as an appropriate protocol adaptor for the current service.

In a possible design, the first protocol adaptor may be a CORBA adaptor, a SOAP adaptor, a RESTful adaptor, or the like.

According to a third aspect, this application further provides a communication apparatus. The communication apparatus has a function of implementing the adaptor client in the method example according to the first aspect. The function may be implemented by hardware, or may be implemented by hardware executing corresponding software. The hardware or the software includes one or more modules corresponding to the foregoing function.

In a possible design, a structure of the communication apparatus includes an obtaining module and a processing module, and optionally, may further include a sending module. These modules may perform corresponding functions in the foregoing method example in the first aspect. For details, refer to detailed descriptions in the method example. Details are not described herein again.

In a possible design, a structure of the communication apparatus includes a communication interface and a processor, and optionally, may further include a memory. The communication interface is configured to receive and send data, and perform communication interaction with another device in a communication system. The processor is configured to support the adaptor client in performing a corresponding function in the foregoing method in the first aspect. The memory is coupled to the processor, and stores program instructions and data that are necessary for the communication apparatus.

According to a fourth aspect, this application further provides a communication apparatus. The communication apparatus has a function of implementing the first protocol adaptor in the method example according to the second aspect. The function may be implemented by hardware, or may be implemented by hardware executing corresponding software. The hardware or the software includes one or more modules corresponding to the foregoing function.

In a possible design, a structure of the communication apparatus includes a receiving module, a processing module, and a sending module. These modules may perform corresponding functions in the foregoing method example in the second aspect. For details, refer to detailed descriptions in the method example. Details are not described herein again.

In a possible design, a structure of the communication apparatus includes a communication interface and a processor, and optionally, may further include a memory. The communication interface is configured to receive and send data, and perform communication interaction with another device in a communication system. The processor is configured to support the first protocol adaptor in performing a corresponding function in the foregoing method in the second aspect. The memory is coupled to the processor, and stores program instructions and data that are necessary for the communication apparatus.

According to a fifth aspect, this application further provides a communication system. The communication system may include the adaptor client, the first protocol adaptor, and the like mentioned in the foregoing design.

According to a sixth aspect, this application further provides a computer storage medium. The computer storage medium stores computer-executable instructions. When invoked by the computer, the computer-executable instructions are used to enable the computer to perform any one of the foregoing methods.

According to a seventh aspect, this application further provides a computer program product including instructions. When the computer program product runs on a computer, the computer is enabled to perform any one of the foregoing methods.

According to an eighth aspect, this application further provides a chip system. The chip system includes a processor, configured to support the communication apparatus in implementing the functions in the foregoing aspects. In a possible design, the chip system further includes a memory. The memory is configured to store program instructions and data that are necessary for the communication apparatus. The chip system may include a chip, or may include a chip and another discrete component.

DESCRIPTION OF EMBODIMENTS

The following further describes in detail this application with reference to the accompanying drawings.

Embodiments of this application provide a communication method and an apparatus, to select an appropriate adaptor to implement that an ONAP adapts to a 3GPP configuration management function. The method and the apparatus described in this application are based on a same inventive concept. Problem resolving principles of the method and the apparatus are similar. Therefore, for implementations of the apparatus and the method, refer to each other, and details of repeated parts are not described again.

In the following, some terms in this application are described, to help a person skilled in the art have a better understanding.

(1) An adaptor client is a device newly proposed in this application that has at least an adaptor management function. For example, the adaptor client may perform registration and deregistration of an adaptor. The adaptor client manages two or more protocol adaptors, and may select an appropriate protocol adaptor according to a requirement.

(2) A protocol adaptor may implement a 3GPP interface protocol function, for example, may implement processing of the CORBA protocol, the SOAP protocol, and the RESTful protocol. Correspondingly, the protocol adaptor may include a CORBA adaptor, a SOAP adaptor, a RESTful adaptor, and the like.

(3) In the descriptions of this application, terms such as "first" and "second" are merely used for distinction and description, and shall not be understood as an indication or implication of relative importance or an indication or implication of an order.

To describe the technical solutions in the embodiments of this application more clearly, the following describes the communication method and the apparatus according to the embodiments of this application in detail with reference to accompanying drawings.

Figure 1:
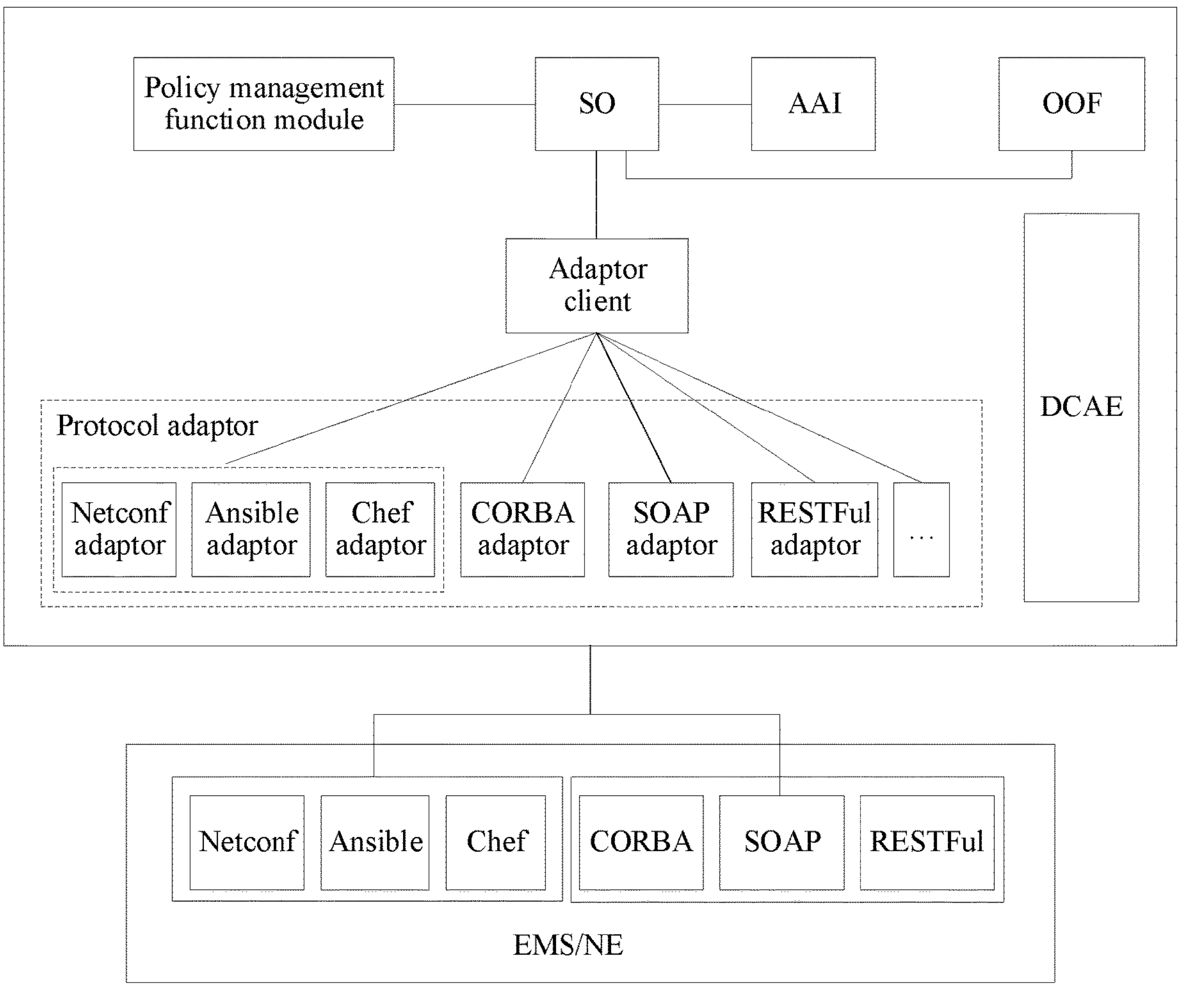
FIG. 1 is a schematic diagram of an architecture of a communication system according to this application.

FIG. 1 shows an architecture of a possible communication system to which a communication method according to an embodiment of this application is applicable. The communication system may be a network where an ONAP and 3GPP service management integrate. For example, an architecture of the communication system may include a policy management function module (policy), a service orchestrator (SO), an available and active inventory management functional entity (available and active inventory, AAI), an ONAP optimization function module (OOF), a data collection and analytics function module (data collection, analytics, and events, DCAE), an adaptor client, a plurality of protocol adaptors, and an element management system (EMS)/network element (NE).

The policy is used to manage ONAP policies.

The SO may receive a service request from an NMS, trigger a corresponding workflow processing process, and send a service processing request to the adaptor client.

The AAI provides real-time views of inventories and their topology relationships, and management functions such as event subscription, notification, data audit, and data version.

The OOF is responsible for network function optimization, for example, physical cell identifier (PCI) optimization.

The DCAE is used for data collection, analytics, and the like.

The adaptor client is configured to manage an adaptor, for example, register or deregister an adaptor, and select an appropriate adaptor according to a requirement. Optionally, the adaptor client may further perform NRM network resource object template mapping.

The plurality of protocol adaptors includes a plurality of adaptors that support different protocols, such as Netconf adaptor, Ansible adaptor, Chef adaptor, CORBA adaptor, SOAP adaptor, and RESTful adaptor. The CORBA adaptor, the SOAP adaptor, and the RESTful adaptor are protocol adaptors that support the 3GPP protocol and can implement the 3GPP interface protocol function.

The EMS is configured to manage a network element in the communication system, that is, the EMS is configured to manage an NE.

The NE is a network element that needs to be configured with a network in the communication system to implement a corresponding service.

It should be noted that the EMS and the NE may coexist in the communication system, or only the NE may exist. The EMS and the NE may support one or more protocols of Netconf, Ansible, Chef, CORBA, SOAP, RESTful, and the like.

It should be noted that, in addition to the protocol adaptor listed above, the communication system may further support another protocol based on a scenario and a requirement.

The foregoing devices, function modules, function entities, and the like may be a network element implemented on dedicated hardware, a software instance running on dedicated hardware, or an instance of a virtualization function on an appropriate platform. This is not limited in this application.

It should be noted that the architecture of the communication system shown in FIG. 1 is not limited to including only the device shown in the figure, and may further include another device not shown in the figure. Details are not described herein in this application one by one.

It should be noted that a distribution form of the devices is not limited in the embodiments of this application. The distribution form shown in FIG. 1 is merely an example, and is not limited in this application.

It should be noted that the name of the device in this application is merely an example, and may be called another name in a future system, but functions are the same. Names of the related devices are not limited in this application.

Figure 2:
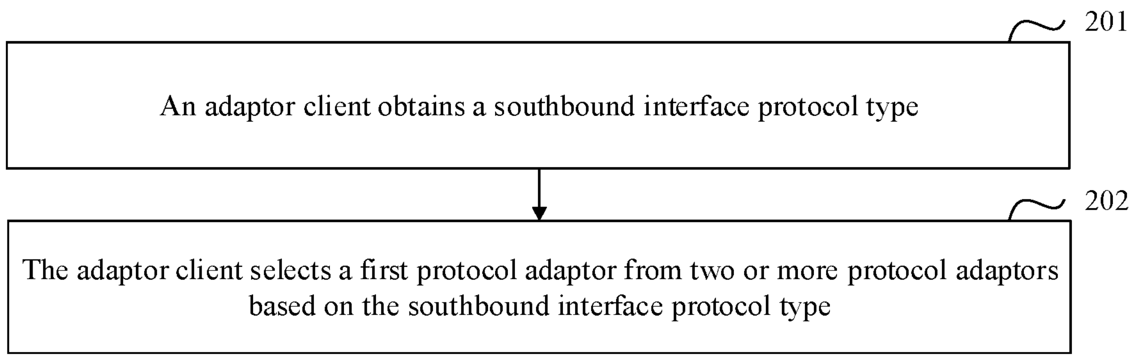
FIG. 2 is a flowchart of a communication method according to this application.

A communication method according to an embodiment of this application is applicable to the communication system shown in FIG. 1. With reference to FIG. 2, a specific procedure of the method includes the following steps.

Step 201: An adaptor client obtains a southbound interface protocol type, where the adaptor client is configured to manage two or more protocol adaptors.

Step 202: The adaptor client selects a first protocol adaptor from the two or more protocol adaptors based on the southbound interface protocol type, where the first protocol adaptor is configured to implement a first protocol.

For example, the protocol adaptors managed by the adaptor client may be two or more of the CORBA adaptor, the SOAP adaptor, the RESTful adaptor, and the like.

Correspondingly, the first protocol adaptor selected by the adaptor client may be one of the CORBA adaptor, the SOAP adaptor, the RESTful adaptor, and the like. For example, when the first protocol adaptor is the CORBA adaptor, the first protocol that can be implemented by the first protocol adaptor is CORBA. Certainly, when the first protocol adaptor is another adaptor, a case is similar. Details are not described herein one by one.

In an optional implementation, the adaptor client may obtain the southbound interface protocol type in two cases. For example:

Case a1: The adaptor client may receive first information from a service orchestrator, where the first information is used to request to perform network configuration for a first network element, the first information is a configuration parameter in a key-value pair form, and the first information includes the southbound interface protocol type. The adaptor client may obtain the southbound interface protocol type from the first information. For example, the key-value pair (key-value) form may be a name-identifier pair form of a parameter, for example, base station-identifier (identity, ID), cell-ID, CU-ID, or DU-ID.

For example, the first information further includes configured parameter data (parameter list), and may further include one or more of the following information: a correlation identifier (correlation ID), a management plane IP address and a port (OM IP and port) corresponding to the first network element, a network resource managed object template (NRM MO template), an operation type (Action), an operation object (Action id), and the like. The correlation ID is an internal temporary identifier that is of a physical network function network element (physical network function, PNF) (that is, the first network element herein) and that is allocated by the AAI when the PNF is registered. The OM IP and port and the NRM MO template are sent to the AAI during PNF registration. For example, a network element registration procedure is further described with reference to FIG. 5 subsequently.

Case a2: The adaptor client obtains the preset southbound interface protocol type, where the preset southbound interface protocol type may also be considered as a default southbound interface protocol type.

For example, when the adaptor client receives first information from a service orchestrator, a method may be specifically as follows: The adaptor client receives, from the service orchestrator, the first information sent by the service orchestrator by invoking a first interface. The first interface is provided by the adaptor client. The first interface may be an existing interface that is reused, for example, an existing configuration application programming interface (configure (application programming interface, API)), or may be a newly defined interface.

In a specific implementation, after the adaptor client receives the first information from the service orchestrator, the adaptor client may perform either of the following two operations.

Operation b1: The adaptor client sends the first information to the first protocol adaptor.

Operation b2: The adaptor client determines second information based on the first information, and sends the second information to the first protocol adaptor, where the second information is a managed object and an object attribute thereof. The second information is obtained by mapping the first information based on a network resource managed object template. The object attribute is a parameter or a parameter set that describes a property of the managed object, for example, a geographical location of a base station. The network resource managed object template includes a correspondence between one or more managed objects and object attributes thereof. When the first information is mapped based on the network resource managed object template, specifically, the managed object and the corresponding object attribute that are included in the corresponding network resource managed object template are determined based on a key-value pair in the first information. Then, the managed object and the corresponding object attribute that are included in the network resource managed object template are determined as the second information. For example, when the first information is the base station-ID, the network resource managed object template includes one or more managed objects related to the base station and object attributes of the one or more managed objects. Then, the one or more managed objects and the object attributes of the one or more managed objects are determined as the second information.

For example, the adaptor client maps the first information into the second information based on the network resource managed object template.

In a specific implementation, the first protocol adaptor provides a second interface, so that the adaptor client sends information to the first protocol adaptor by invoking the second interface.

For example, when the adaptor client sends the first information to the first protocol adaptor, the adaptor client sends the first information to the first protocol adaptor by invoking the second interface provided by the first protocol adaptor.

Alternatively, when the adaptor client sends the second information to the first protocol adaptor, the adaptor client sends the second information to the first protocol adaptor by invoking the second interface provided by the first protocol adaptor.

In a specific implementation, the second interface may be an existing interface, or may be a newly defined interface.

In an optional implementation, when the first information does not include the NRM MO template, the adaptor client may further perform the following operations: The adaptor client sends a network resource model template query request to the first network element, and receives a network resource object model of the first network element from the first network element. The network resource object model is the network resource managed object template, and the two descriptions may be exchanged in this application.

For example, when there is an element management system that manages the first network element in the communication system, the adaptor client sends the network resource model template query request to the first network element by using the element management system. For example, the adaptor client first sends the network resource model template query request to the element management system, and then the element management system sends the network resource model template query request to the first network element. Correspondingly, when the first network element receives the network resource object model of the first network element, for example, the first network element sends the network resource object model to the element management system, and then the element management system sends the network resource object model to the adaptor client.

When there is no element management system in the communication system, the adaptor client directly sends the network resource model template query request to the first network element, and directly receives the network resource object model of the first network element from the first network element.

In a specific implementation, when the adaptor client manages a protocol adaptor, the protocol adaptor needs to be registered with the adaptor client. For example, a registration process of the first protocol adaptor may be as follows: The adaptor client receives third information from the first protocol adaptor, where the third information includes a name, an identifier, and a supported protocol type of the first protocol adaptor. The adaptor client creates context information locally on the adaptor client based on the third information. The adaptor client sends fourth information to the first protocol adaptor, where the fourth information is used to notify the first protocol adaptor of a registration result. The name of the first protocol adaptor may be an actual name of the first protocol adaptor, and the identifier of the first protocol adaptor may be a code or a number (for example, an ID) of the first protocol adaptor. It should be noted that the name and the identifier may also be a same concept, and either the name or the identifier may be used to represent the first protocol adaptor. In this case, the name or the concept may include examples of the name and the identifier in the foregoing description.

For example, a registration process of any protocol adaptor is similar to a composition of registration of the first protocol adaptor. For details, refer to descriptions in the registration process of the protocol adaptor shown in FIG. 4.

According to the communication method provided in this embodiment of this application, the adaptor client obtains the southbound interface protocol type, and the adaptor client selects the first protocol adaptor from the two or more protocol adaptors based on the southbound interface protocol type, where the first protocol adaptor is configured to implement the first protocol. According to the foregoing method, to implement that an ONAP adapts to a 3GPP configuration management function, when an interface adaptor (for example, a CORBA adaptor, a SOAP adaptor, and a RESTful adaptor) that adapts to a 3GPP configuration management protocol is added to a southbound interface of the ONAP, an appropriate adaptor can be flexibly selected by the adaptor client. Therefore, integration of the ONAP and 3GPP service management can be implemented.

Figure 3:
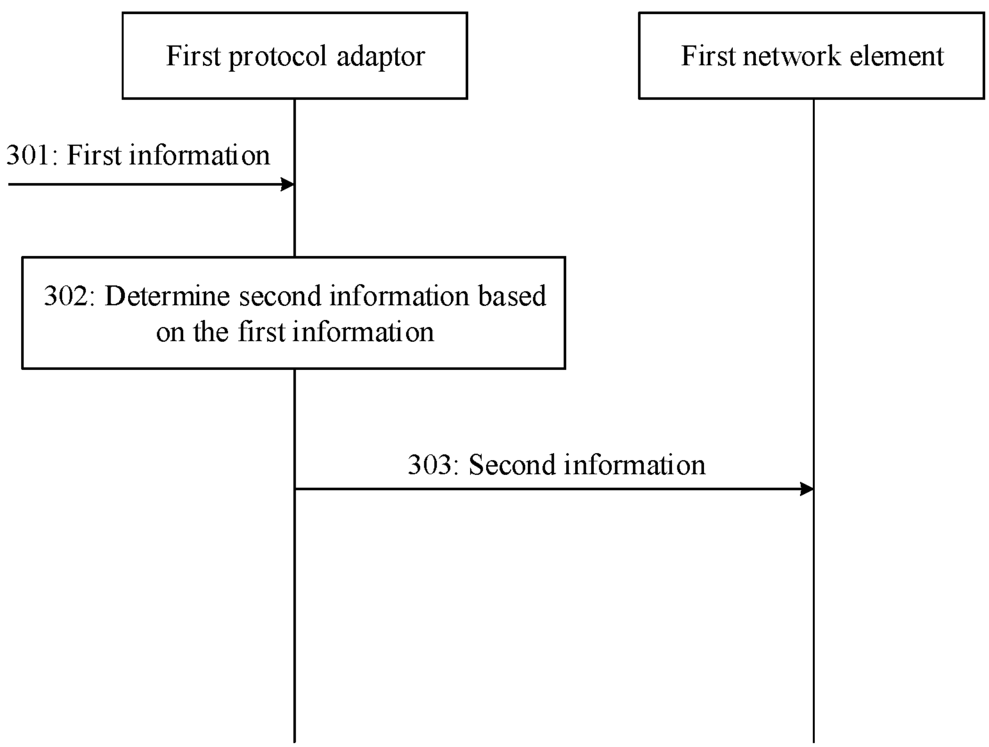
FIG. 3 is a flowchart of another communication method according to this application.

An embodiment of this application further provides a communication method. With reference to FIG. 3, a procedure of the method may include the following steps.

Step 301: A first protocol adaptor receives first information, where the first information is a configuration parameter in a key-value pair form, the first information is a configuration parameter used to perform network configuration for a first network element, and the first protocol adaptor is configured to implement a first protocol.

Step 302: The first protocol adaptor determines second information based on the first information, where the second information is a managed object and an object attribute thereof, and the second information is obtained by mapping the first information based on a network resource managed object template.

Step 303: The first protocol adaptor sends the second information to the first network element.

For example, the first protocol adaptor maps the first information into the second information based on the network resource managed object template.

For example, for content included in the first information, refer to the description of the first information in the embodiment shown in FIG. 2. Details are not described herein again.

For example, the first protocol adaptor is a CORBA adaptor, a SOAP adaptor, a RESTful adaptor, or the like.

In an optional implementation, that a first protocol adaptor receives first information may be specifically classified into the following two cases.

Case c1: The first protocol adaptor receives the first information from an adaptor client, where the adaptor client is configured to manage two or more protocol adaptors.

The case c1 corresponds to a case in which the adaptor client performs the operation b1 in the embodiment shown in FIG. 2. In this case, the first protocol adaptor is managed by the adaptor client.

Case c2: The first protocol adaptor receives the first information from a service orchestrator.

In the case c2, a possible scenario may be that only the first protocol adaptor exists in a communication system, and no other adaptor exists. In this case, the adaptor client may not be set in the communication system. Certainly, the adaptor client may alternatively be set. When the adaptor client is set, the adaptor client manages only the first protocol adaptor.

In an optional implementation, the first protocol adaptor provides the second interface, to enable another device to invoke the second interface to send information to the first protocol adaptor.

For example, when the first protocol adaptor receives the first information from the adaptor client, the first protocol adaptor receives the first information sent by the adaptor client by invoking the second interface. The second interface is provided by the first protocol adaptor.

When the first protocol adaptor receives the first information from the service orchestrator, the first protocol adaptor receives the first information sent by the service orchestrator by invoking the second interface.

In a specific implementation, the second interface may be an existing interface, or may be a newly defined interface.

In an optional implementation, when the first information does not include the NRM MO template, the first protocol adaptor further performs the following operations: The first protocol adaptor sends a network resource model template query request to the first network element, and receives a network resource object model of the first network element from the first network element.

For example, when there is an element management system that manages the first network element in the communication system, the first protocol adaptor sends the network resource model template query request to the first network element by using the element management system. For example, the first protocol adaptor first sends a network resource model template query request to an element management system, and then the element management system sends the network resource model template query request to a first network element. Correspondingly, when the first network element receives a network resource object model of the first network element, for example, the first network element sends the network resource object model to the element management system, and then the element management system sends the network resource object model to the first protocol adaptor.

When there is no element management system in the communication system, the first protocol adaptor directly sends the network resource model template query request to the first network element, and directly receives a network resource object model of the first network element from the first network element.

In a specific implementation, when the first protocol adaptor is managed by the adaptor client, the first protocol adaptor needs to first be registered with the adaptor client. A specific process may include: The first protocol adaptor sends third information to the adaptor client, where the third information includes a name, an identifier, and a supported protocol type of the first protocol adaptor. The first protocol adaptor receives fourth information from the adaptor client, where the fourth information is used to indicate a registration result to the first protocol adaptor. For example, for a registration process of the first protocol adaptor, refer to the process in FIG. 4.

According to the communication method provided in this embodiment of this application, the first protocol adaptor receives first information, where the first information is a configuration parameter in a key-value pair form, the first information is a configuration parameter used to perform network configuration for a first network element, and the first protocol adaptor is configured to implement a first protocol. The first protocol adaptor determines second information based on the first information, where the second information is a managed object and an object attribute thereof. The second information is obtained by mapping the first information based on a network resource managed object template. The first protocol adaptor sends the second information to the first network element. According to the foregoing method, integration of an ONAP and 3GPP service management can be implemented.

Figure 4:
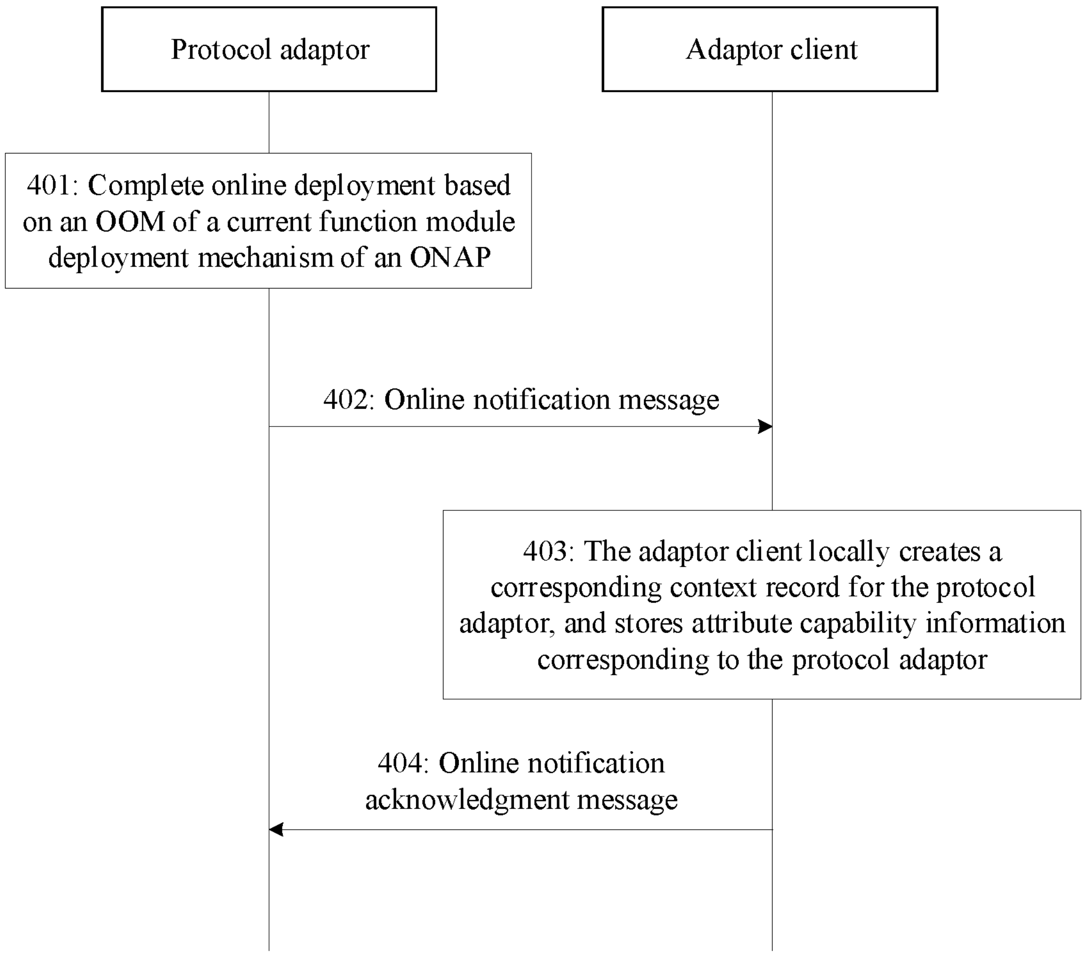
FIG. 4 is a flowchart of protocol adaptor registration according to this application.

Based on the description of the foregoing embodiment, when an adaptor client is set in a communication system to manage a protocol adaptor, the protocol adaptor needs to be registered with the adaptor client. In practice, there are a plurality of adaptor types, and different adaptors support different protocol functions, such as a CORBA adaptor, a SOAP adaptor, and a RESTful adaptor. Therefore, after each adaptor is successfully deployed, the adaptor needs to send adaptor attribute capability information (for example, a supported protocol type) to an adaptor client. The adaptor client manages adaptors corresponding to interfaces in a unified manner. In subsequent network configuration and management process, the adaptor client can select an appropriate adaptor based on capability of the adaptor. Otherwise, when the adaptor goes offline, the adaptor information stored in the adaptor client is deleted through related processes. For example, FIG. 4 shows a registration procedure after the protocol adaptor goes online. For example, the procedure may include the following steps.

Step 401: A protocol adaptor completes online deployment based on an ONAP operations manager (OOM) function of a current function module deployment mechanism of an ONAP.

Step 402: The protocol adaptor sends an adaptor online notification message to an adaptor client.

For example, when any protocol adaptor (xx Adaptor) is deployed, information (for example, an adaptor client IP address) about an adaptor client that manages the protocol adaptor is configured. After being powered on, the protocol adaptor may send an adaptor online notification message to the adaptor client identified by the configured adaptor client IP address. The adaptor online notification message carries a protocol adaptor name, a protocol adaptor identifier (Adaptor ID), and a supported protocol type (Adaptor type), where the adaptor ID may be an ID that can uniquely identify and recognize the protocol adaptor, for example, an IP address or a number of the adaptor. The adaptor type may be CORBA, SOAP, RESTful, or the like (if other protocol types are supported in future extension, the value of this parameter needs to be extended to support the corresponding protocols).

For example, when the protocol adaptor is the first protocol adaptor, the online notification message is the third information in the embodiment shown in FIG. 2 or FIG. 3.

Step 403: After receiving the online notification message of the protocol adaptor, the adaptor client locally creates a corresponding context record for the protocol adaptor, and stores attribute capability information corresponding to the protocol adaptor (that is, the parameter information sent in step 402).

Step 404: After completing recording registration information of the protocol adaptor, the adaptor client returns an adaptor online notification acknowledgment message to the protocol adaptor, and acknowledges a registration result.

The result value may be registration-accept, registration-reject, error, or the like.

For example, when the protocol adaptor is the first protocol adaptor, the online notification acknowledgment message is the fourth information in the embodiment shown in FIG. 2 or FIG. 3.

It should be noted that the message in step 402 and step 403 is merely an example, and may alternatively be another message having a same function. For example, the online notification message may be replaced with an adaptor registration request (Adaptor register request). In addition, the online notification acknowledgment message may be replaced with an adaptor register response.

In the foregoing registration process, the adaptor client uniformly manages deployed and online protocol adaptors. In a subsequent service processing process (for example, configuration management), the adaptor client may select an adapted protocol adaptor based on information, for example, a protocol type supported by an NE. Through the process, the adaptor client can obtain the deployed and online protocol adaptors and their attribute capability information in a timely manner. In this way, the adaptor client can select an appropriate protocol adaptor to implement integration of an ONAP and 3GPP service management.

Figure 5:
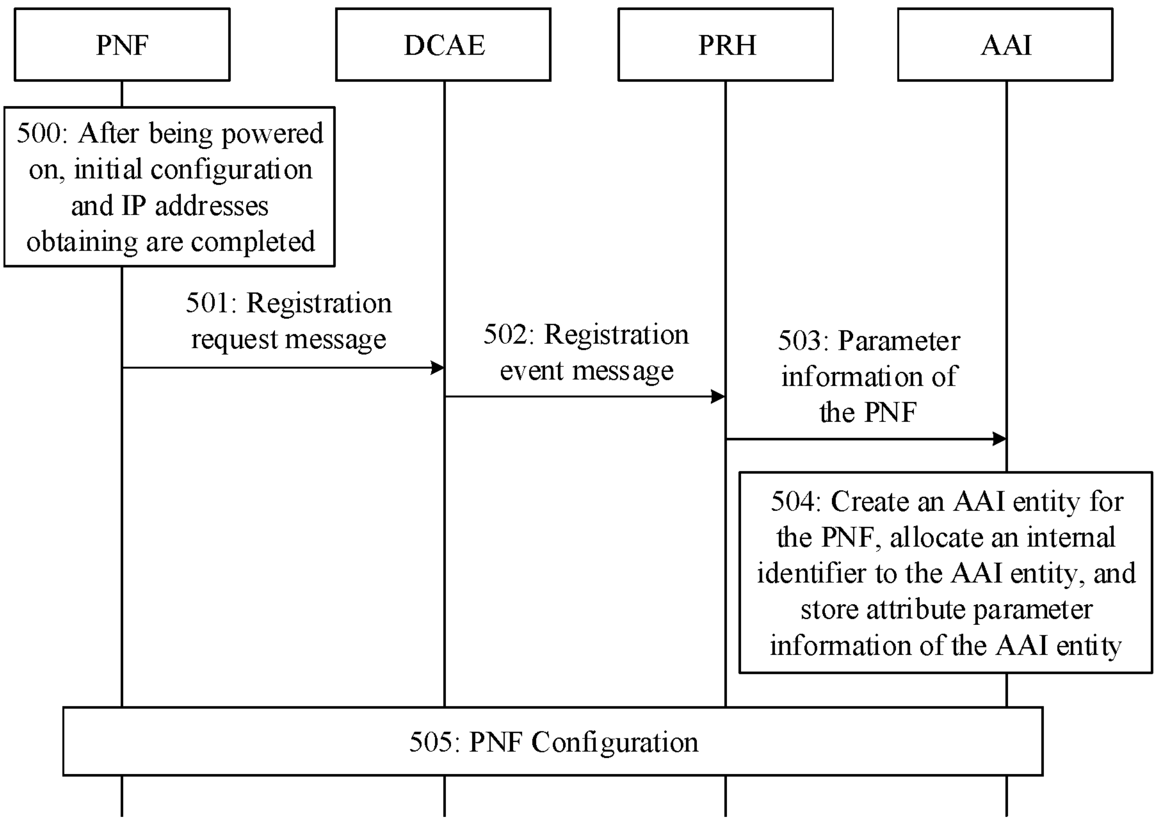
FIG. 5 is a flowchart of network element registration according to this application.

Based on the foregoing embodiment, when network configuration is implemented for a network element, an appropriate protocol adaptor needs to be selected with reference to an interface protocol supported by the network element. However, in practice, network devices (network elements) of different vendors may support only one interface protocol (for example, the CORBA protocol) or a plurality of interface protocols (for example, both the CORBA protocol and the SOAP protocol are supported). In addition, network devices of different vendors may support different NRM templates. For example, a product of vendor A supports an NRM model of the R1 version, and a product of vendor B supports an NRM model of the R2 version. Therefore, network resource objects based on NRM models of different versions cannot communicate with each other. For example, based on the NRM model of the R1 version, a network device may be modeled as five MOs, but based on the NRM model of the R2 version, a network device may be modeled as 10 MOs. Therefore, to accurately obtain attribute capability information of a network device, the network device, for example, a physical network function (PNF) network element, after being deployed, needs to indicate the attribute capability information of the network device to a corresponding ONAP function module (for example, AAI) for storage. For example, FIG. 5 shows a registration procedure of a PNF. The procedure may specifically include the following steps.

Step 500: After a PNF is powered on, initial configuration and IP address obtaining are completed.

In step 500, a management plane IP address and a port of an ONAP are obtained.

Step 501: The PNF sends a PNF registration request message to a management plane function module (for example, a DCAE) identified by the management plane IP address and the port of the ONAP that are obtained in step 500.

For example, a parameter of a protocol type supported by the PNF (may be CORBA, SOAP, RESTful, or the like), an NRM MO template supported by the PNF, and a management plane IP and a port of the PNF are added to the PNF registration request message.

In the conventional technology, the message may be reported to the DCAE in a form of a virtual network function event streaming ((Virtual network function, VNF) event streaming, VES) event. The NRM MO template indicates a network resource object model (for example, a tree structure model, including a plurality of MOs and relationships (such as inheritance) between the MOs) corresponding to an NRM modeling method of a corresponding version supported by the PNF. A value of the protocol type supported by the PNF may be CORBA-only, SOAP-only, RESTful-only, CORBA and SOAP supported, RESTful and SOAP supported, CORBA and RESTful supported, and full-supported. If the PNF supports a plurality of protocols, a preferred protocol is specified. For example, the value of the protocol type supported by the PNF is CORBA and RESTful supported, and specifies that the CORBA is preferred (CORBA preferred) or the CORBA has a high priority for selection (CORBA with high-priority selected).

Step 502: The DCAE parses the PNF registration request message, obtains parameter information included in the PNF registration request message, sends a registration event message to a PRH, and sends the added parameter information in step 501 to the PRH.

Step 503: The PRH notifies an AAI to create a corresponding AAI entity for a newly registered PNF, and sends the parameter information of the PNF to the AAI.

Step 504: The AAI creates the AAI entity for the PNF, allocates an internal identifier Correlation ID to the PNF, and stores attribute parameter information of the PNF.

The attribute parameter information may include the parameter of the protocol type supported by the PNF, the NRM MO template supported by the PNF, and the parameter of the management plane IP and the port of the PNF.

Step 505: The ONAP function module performs PNF configuration.

In an optional implementation, if NRM network resource models corresponding to different versions have been configured in the ONAP function module (for example, an AAI), in step 501, the PNF does not need to include the NRM MO template supported by the PNF in the PNF registration request message, but only needs to register an NRM version (for example, NRM Version) supported by the PNF with the DCAE (in subsequent service processing, the ONAP function module can query a corresponding NRM MO model based on the NRM version). Therefore, the newly added parameters that should be included in steps 501, 502, and 503 include the parameter of the protocol type supported by the PNF, the NRM version supported by the PNF, and the management plane IP and the port of the PNF.

When the PNF is the first network element in the foregoing embodiment, the foregoing procedure is a registration procedure of the first network element, and a related parameter is a parameter of the first network element.

Further, when capability information of the PNF (for example, the supported NRM version or NRM MO template upgrading) changes, the PNF needs to update the registration information. During an update procedure, the PNF sends a VES event to the DCAE and sends updated information to the DCAE. The DCAE sends an update request to the PRH, and the PRH updates the PNF information stored in the AAI. A detailed procedure is similar to the registration procedure described in FIG. 5, except that names of steps 502, 503, and 504 are different. The message carries only necessary identifiers (for example, a PNF ID) and updated parameters. For a specific procedure, refer to the foregoing registration procedure. Details are not described herein again.

The following embodiments in FIG. 6A and FIG. 6B to FIG. 11A and FIG. 11B are respectively based on the foregoing embodiments, and are examples of using the communication method according to the embodiments of this application in a configuration management procedure of the NE network element implemented by the NMS by using the ONAP function module. For example, in the following example, an AAI is used as an example for describing the available inventory management functional entity, an SO is used as an example for describing the service orchestrator, an NE is used as an example for describing the first network element, an EMS is used as an example for describing the element management system, and the like. For example, the following example is applicable to management processes such as initial configuration management of an NE in a site deployment scenario, and modification of an NE configuration parameter and deletion of an NE configuration parameter in a network operation and maintenance scenario or a service feature (features such as mobility load balancing (MLB), carrier aggregation (CA)) deployment scenario. The site deployment scenario is that a site deployment process is actually performing basic parameter configuration on a newly deployed network device (that is, an NE, for example, a base station), so that the network device can perform service processing. The service feature deployment scenario is that: Generally, deployment data of a service feature (for example, a MO and attributes corresponding to the service feature) is imported into the EMS/NE system together with site deployment data during site deployment. In this case, a main function of service feature deployment is to modify an attribute parameter of the managed object related to the service feature to support the service processing of the feature. For example, the MLB feature deployment needs to modify a parameter setting of an MLB-related MO, such as turning on an MLB algorithm switch and setting a cell id of a cell where the MLB is enabled, to enable a base station to support MLB processing.

Figure 6A:
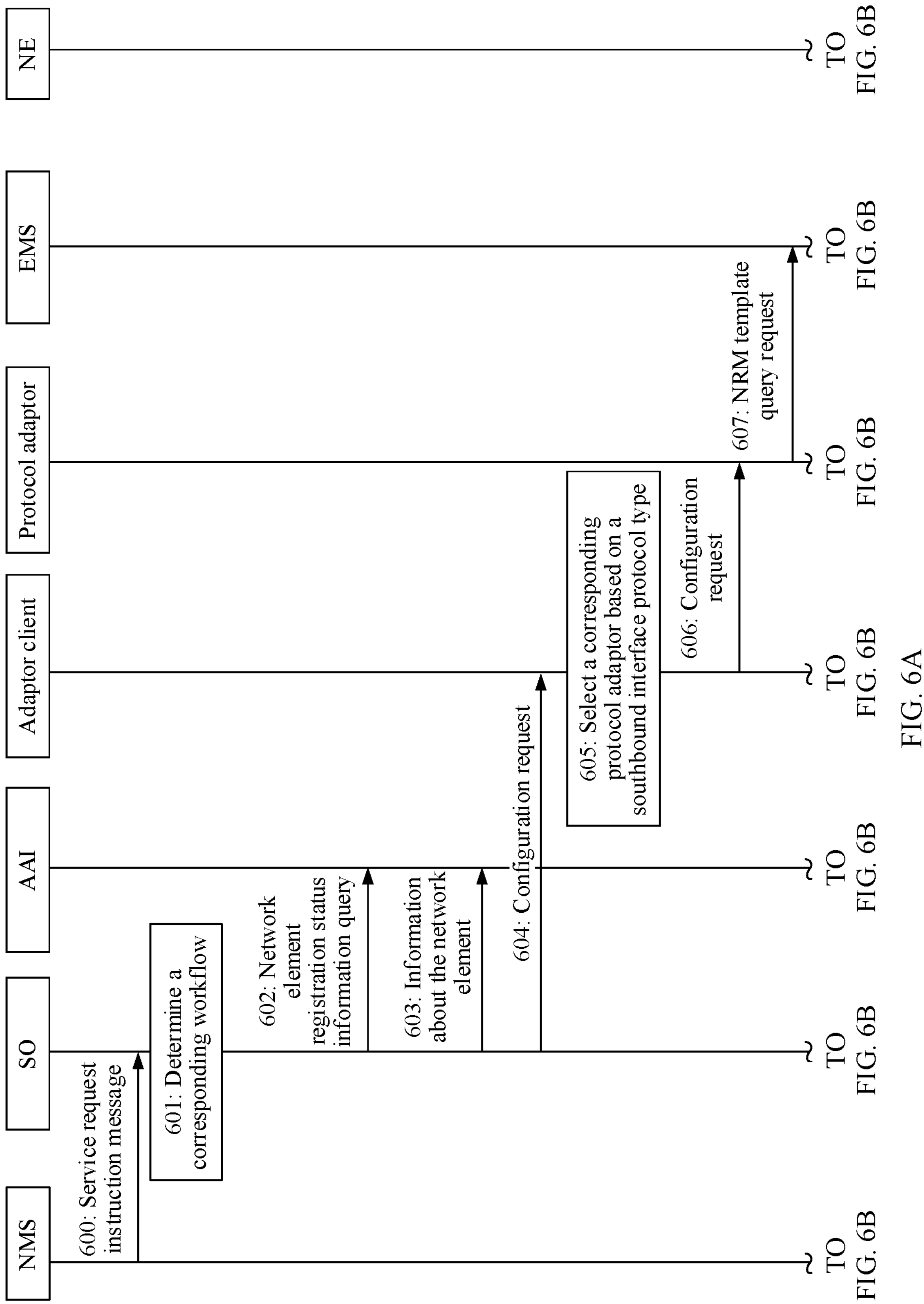
FIG. 6A and FIG. 6B are a flowchart of an example of a communication method according to this application.
Figure 6B:
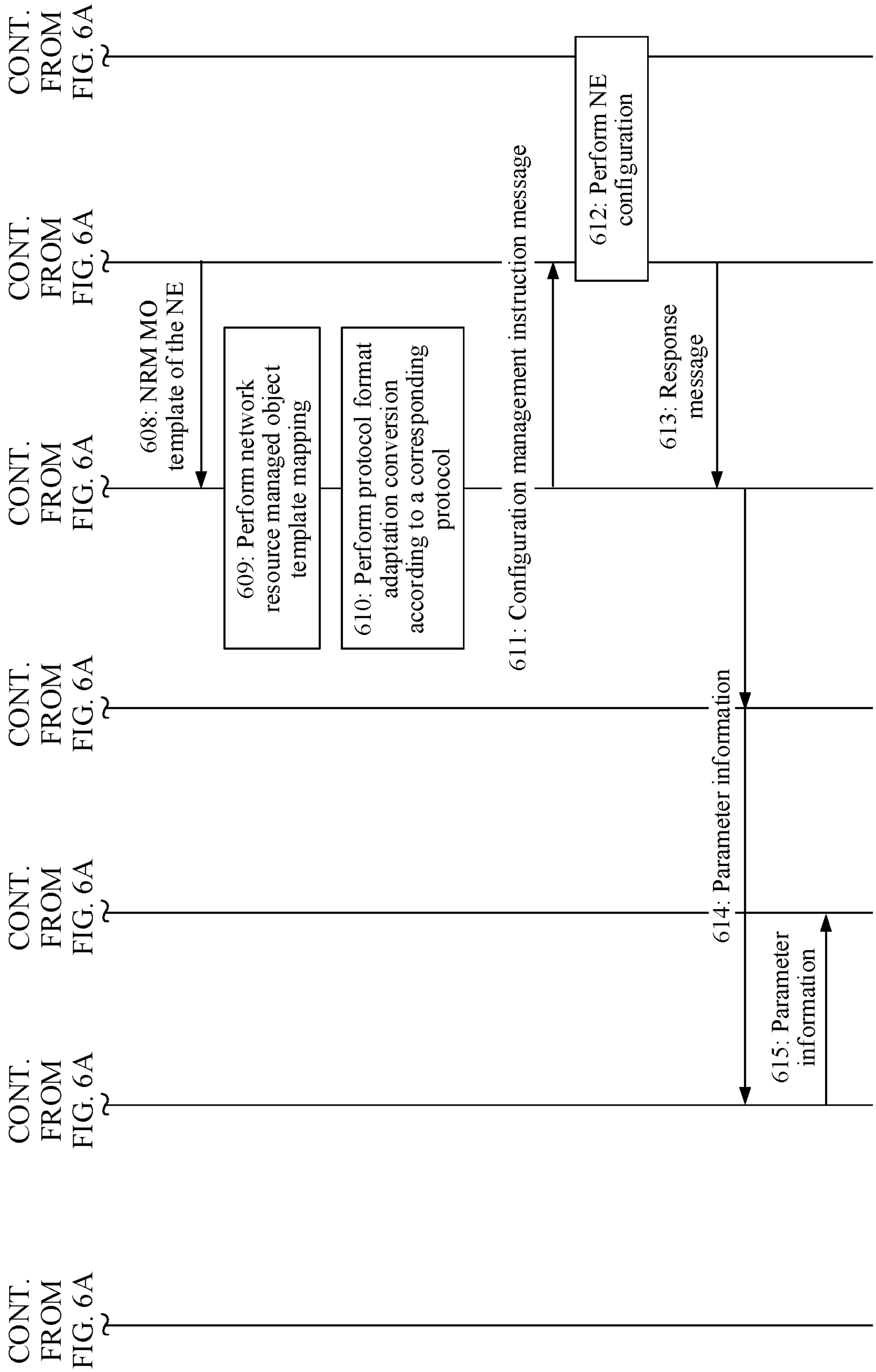

FIG. 6A and FIG. 6B show an example: In a process in which an SO receives a service request from an NMS, determines, based on a request parameter, a service workflow that needs to be executed, and schedules a corresponding adaptor client and a protocol adaptor to perform configuration processing, the communication method according to this embodiment of this application is applied. A procedure of the example may specifically include the following steps.

Step 600: The NMS sends a service request instruction message (service request) to the SO, where the service request instruction message may include a related parameter list, and optionally, may further include one or more of the following: a requested operation type (Action), an operation object (Action id), and a southbound interface protocol type. Specifically:

Action: The value of the Action may be create-action, modify-action, and delete-action. If the service request instruction message does not carry this parameter, the Action is Create-action by default.

The Action id indicates an operation object type of the foregoing Action, and the value may be NEfunction-type, cell-type, cell neighbor relationship type (Cell Relation-type), or the like. If the service request instruction message does not carry the parameter, the foregoing Action is for all operation objects by default. The Action id is defined based on a MO type abstracted in NMR modeling (that is, the MO type defined by the NRM is a value range of Action id). For example, an NRM MO of 5G NR includes a base station distributed unit function ((gNodeB, GNB) (distributed unit, DU) function), a GNB central unit (CU) function, a new radio cell (NRCell), a new radio cell neighbor relationship (NRCellRelation), and the like. The value range of the Action id includes GNBDUFunction-type, GNBCUFunction-type, NRCell-type, NRCellRelation-type, and the like.

The parameter list is parameter data that needs to be configured by the NMS, and the parameter list is in a "key-value" pair form. Specifically, the parameter list may include planned configuration data of an operator, such as a network element identifier (NE ID), a cell identifier, a neighbor cell configuration relationship, a frequency setting, a feature ID, and an identifier of a cell where a feature is enabled.

The southbound interface protocol type may be CORBA-selected, SOAP-selected, or RESTful-selected. It identifies a southbound interface protocol type that the NMS expects to use. The parameter is used as a reference when an adaptor client selects a protocol adaptor in subsequent procedures. If the service request instruction message does not carry the parameter, the adaptor client selects the protocol adaptor based on the default priority of a protocol type supported by an NE, that is, the adaptor client selects the protocol adaptor based on a predefined southbound interface protocol type.

The Action and the Action id are in a one-to-one correspondence. If the service request instruction message involves a plurality of operation objects, Action of each type of object is involved.

Step 601: The SO determines, based on the service request of the NMS, a corresponding workflow, to trigger execution of a corresponding service processing procedure.

First, the SO obtains, from the parameter list in step 600, a network element identifier (NE ID) of a network element to which the service request is directed, and initiates a request to the AAI, for querying and determining a registration status of the corresponding NE. The network element may be the first network element in the embodiment shown in FIG. 2 or FIG. 3.

The workflow is a predefined service execution workflow, and may include all function modules that execute the service processing and an execution sequence in which the function modules participate in the service processing. For example, a configuration management workflow is: SO-AAI (execute information query acknowledgment)—adaptor client (execute MO template mapping and adaptor selection)—protocol adaptor (execute interface protocol conversion).

Step 602: The SO sends a network element registration status information query (NE onboarding status check) to the AAI, to query and determine whether the network element to be operated has completed online registration, where the network element registration status information query carries a network element identifier (NE ID).

In an implementation, this step may be further used to query whether a network element (for example, a base station) supports a service feature (for example, an MLB feature), that is, query the AAI to determine whether an attribute of an AAI entity of the corresponding network element includes an MLB-related deployment parameter configuration. If yes, the MLB feature is supported. Otherwise, the feature is not supported.

Step 603: If the queried network element identified by the NE ID does not store corresponding registration information in the AAI, the AAI returns that the network element status is "unavailable". After receiving the returned message, the SO indicates the NMS that the registration of the corresponding network element is not completed, and the procedure ends. If the queried network element identified by the NE ID has stored the corresponding registration information in the AAI, the AAI returns the information about the network element, including NE ID, Correlation ID, OM IP and port, and NRM MO template. The Correlation ID is an internal temporary identifier of a PNF allocated by the AAI during PNF registration. The OM IP and port and the NRM MO template are sent to the AAI during the PNF registration.

Step 604: The SO invokes a first configuration application programming interface (configure API) to initiate a configuration processing procedure, sends a configuration request to the adaptor client, and sends related parameters in step 600 and step 603 to the adaptor client, where the related parameters include the Parameter list. Optionally, one or more of the following items may be further included: Correlation ID, OM IP and port, NRM MO template, Action, Action id, and a southbound interface protocol type.

For example, the first configure API is the first interface in the embodiment shown in FIG. 2. In this step, the first interface is an existing configured interface.

When the related parameters include the southbound interface protocol type, the foregoing step is equivalent to a case in which the SO sends the first information to the adaptor client in case a1 in the embodiment shown in FIG. 2.

Step 605: After receiving the configuration request of the SO, the adaptor client selects a corresponding protocol adaptor based on the southbound interface protocol type.

For example, if the configuration request in step 604 includes the southbound interface protocol type, the southbound interface protocol is directly used. If the parameter is not carried, the adaptor client selects the protocol adaptor based on the default priority (a preset southbound interface protocol type) of a protocol type supported by the NE.

The protocol adaptor selected by the adaptor client herein may be the first protocol adaptor in the embodiment shown in FIG. 2 or FIG. 3.

Step 606: The adaptor client invokes a second configure API to initiate interface adaptor configuration processing, that is, forward the configuration request to the selected protocol adaptor.

For example, step 606 is the operation b1 in the embodiment shown in FIG. 2.

The second configure API is the second interface in the embodiment shown in FIG. 2. In this step, the second interface is a reused existing second interface.

Step 607: The protocol adaptor sends an NRM template query request to the EMS/NE, and requests to obtain an NRM MO template supported by the NE, where the request message carries the NE ID and an NRM version. The NRM version has no actual value and is only a parameter indication that is used to indicate the EMS/NE that the NRM MO template needs to be obtained.

It should be noted that if a device vendor uses a private NRM MO and does not want an ONAP or the like to sense an NRM modeling method of the device vendor, the network device of the device vendor does not register the NRM MO template with the AAI during registration. In this case, if there is no NRM MO template parameter in steps 603 and 606, the protocol adaptor needs to perform this step and subsequent step 608.

For example, when an EMS exists in the communication system, the protocol adaptor sends the NRM template query request to the EMS, and the EMS forwards the NRM template query request to the NE. If no EMS exists in the communication system, the protocol adaptor directly sends the NRM template query request to the NE.

Step 608: The EMS/NE returns a requested NRM MO template of the NE to the protocol adaptor, where the returned NRM MO template is a network resource object model corresponding to an NRM modeling method of a corresponding version supported by the NE (for example, a tree structure model, including a plurality of MOs and relationships (such as inheritance) between MOs).

Correspondingly, when an EMS exists in the communication system, the NE sends the NRM MO template to the EMS, and then the EMS forwards the NRM MO template to the protocol adaptor. If no EMS exists in the communication system, the NE directly sends the NRM MO template to the protocol adaptor.

Step 609: The protocol adaptor performs network resource managed object template mapping.

For example, after receiving parameters such as the NRM MO template, the parameter list, and the Action id, the protocol adaptor determines, based on the Action id, a MO type of a network resource object that needs to be operated, and identifies a model attribute of the corresponding MO type based on the NRM MO template, to map the parameter list ("key-value") to MOs, that is, to convert the parameter list to corresponding MO objects and attribute parameters. The protocol adaptor determines operation processing for the corresponding MO based on the Action. If step 600 does not include the Action and the Action id, the protocol adaptor performs default processing, that is, creates all MO objects of the NRM MO template.

Step 610: The protocol adaptor performs protocol format adaptation conversion according to a corresponding protocol, including operation conversion and parameter conversion. For example, a CORBA adaptor converts a Create MO operation into a CORBA creating object operation Create_managed_object. For detailed conversion processing, refer to processing in the existing 3GPP standard. A conversion process is not described in detail in this application.

Step 611: The protocol adaptor invokes a southbound interface API/SB API to send a corresponding configuration management instruction message to an address identified by the OM IP and a port identified by the port.

Step 612: The EMS receives instructions and executes configuration of the NE.

Step 613: After completing configuration management processing of the NE, the EMS returns a response message to the protocol adaptor, and includes the MO and MO attribute parameter that are set by the EMS in the message.

Step 614: After receiving the response message, the protocol adaptor sends parameter information to the SO, including converting the MO and MO attribute parameter that are carried in step 613 into parameter in a corresponding "key-value" pair form, where the Correlation ID and updated parameters are carried.

Step 615: The SO updates the parameter information of the network element (NE) entity stored in the AAI, which carries the Correlation ID and the updated parameters.

In an optional implementation, steps 602 and 603 in the foregoing example may be performed by the adaptor client, that is, the SO completes the processing in step 601, and directly initiates the configuration management to the adaptor client, that is, step 604 is performed. In this case, step 604 includes only the NE ID, the southbound interface protocol type, the parameter list, the Action, and the Action id. After receiving step 604, the adaptor client performs the operations in the foregoing steps 602 and 603 to obtain information such as the Correlation ID, the OM IP and port, and the NRM MO template, that is, the adaptor client sends the network element registration status information query to the AAI, and then receives the returned message. Then the adaptor client performs the subsequent steps. Correspondingly, corresponding operations involved in subsequent examples shown in FIG. 7A and FIG. 7B and FIG. 8A and FIG. 8B are similar. Details are not described one by one herein in this application.

Figure 7A:
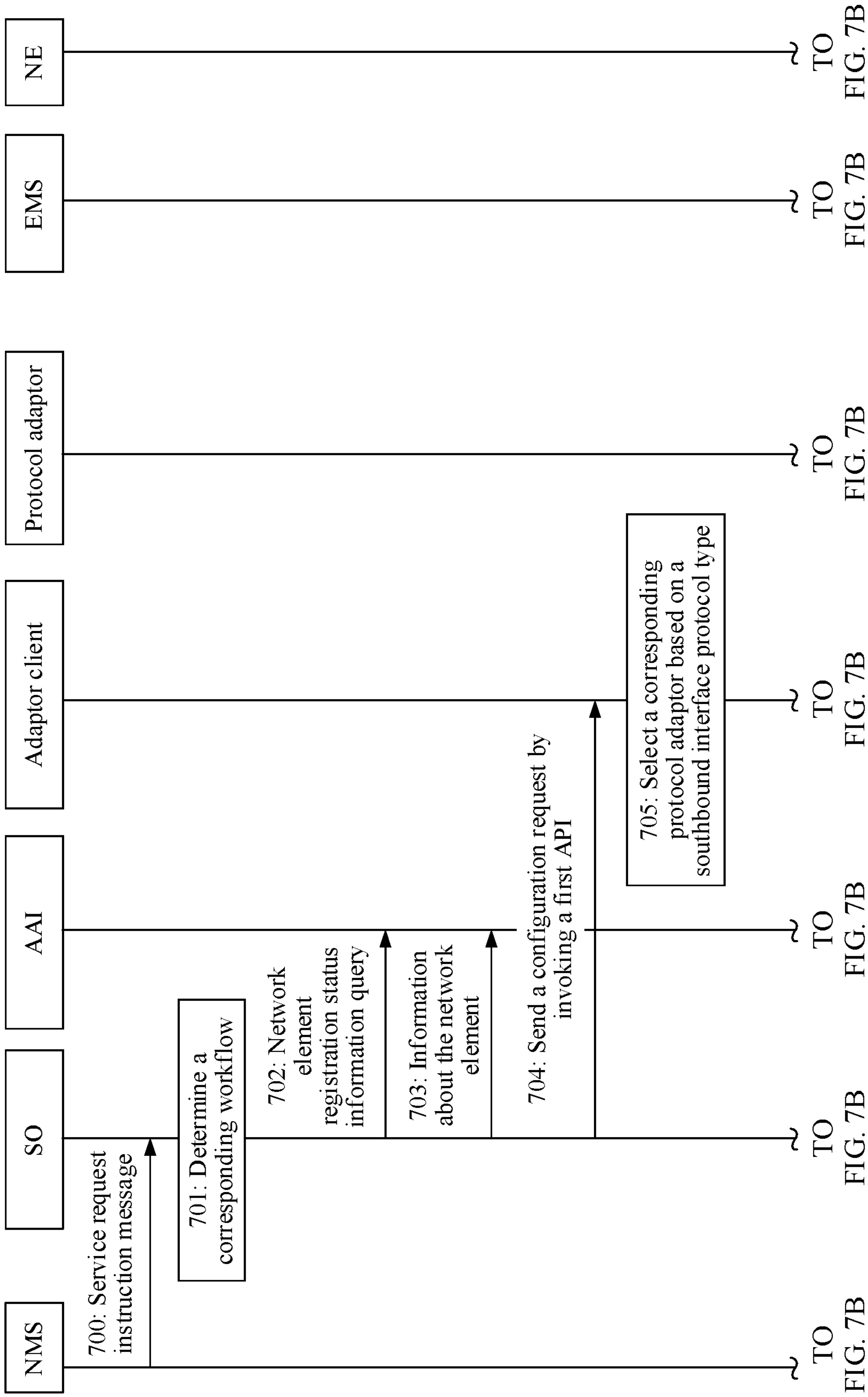
FIG. 7A and FIG. 7B are a flowchart of an example of another communication method according to this application.
Figure 7B:
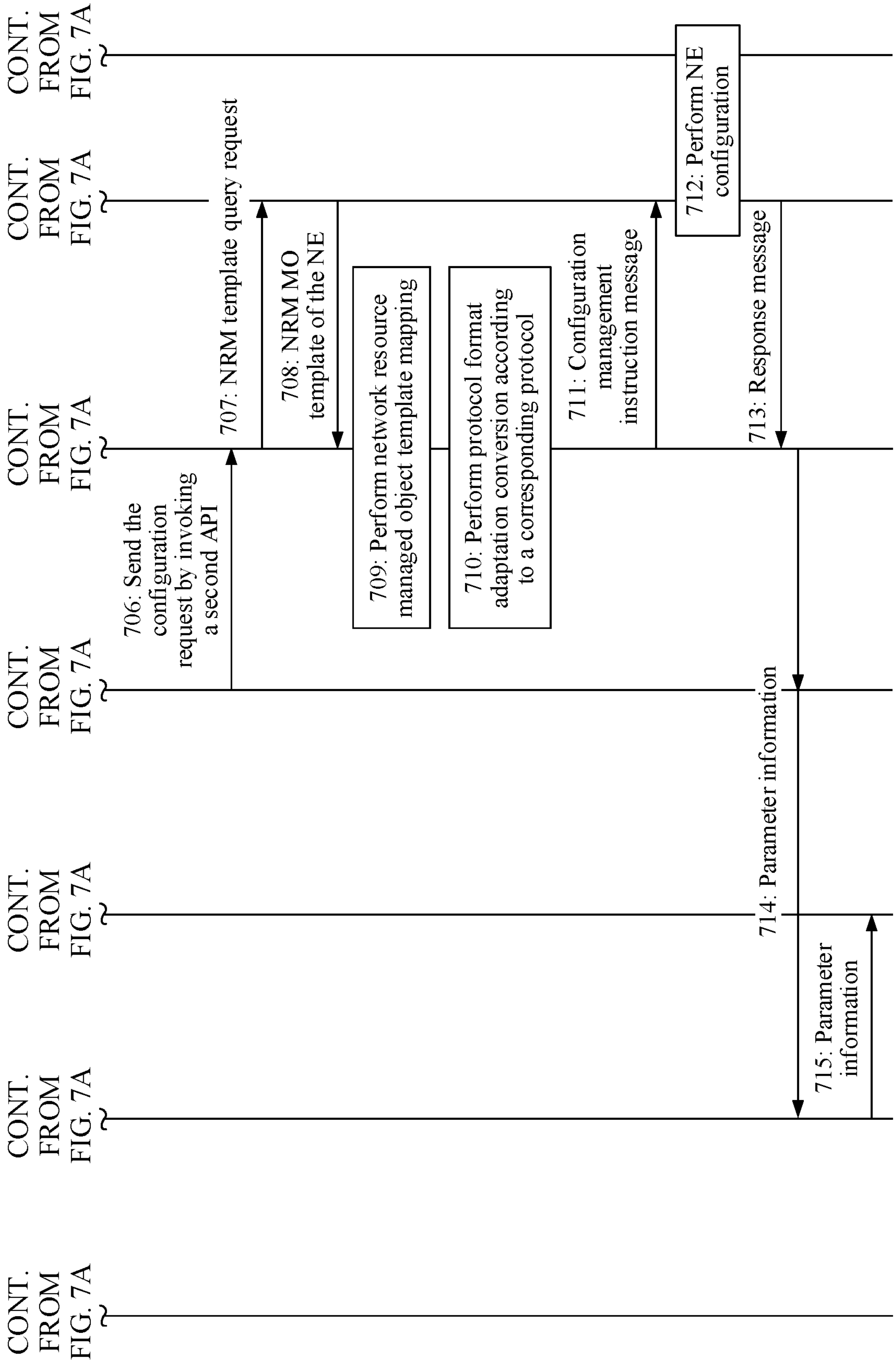

FIG. 7A and FIG. 7B show an example of applying another communication method according to an embodiment of this application. A scenario in this example is the same as the scenario in the example shown in FIG. 6A and FIG. 6B. In the embodiment shown in FIG. 6A and FIG. 6B, interface invocation among the SO, the adaptor client, and the protocol adaptor uniformly reuses the configure API that has been supported in the conventional technology, and the function module identifies the functions to be executed based on parsing of the Action parameter. In the example shown in FIG. 7A and FIG. 7B, a plurality of different APIs are defined for interfaces between an SO, an adaptor client, and an xx adaptor. A function module determines, based on an API type, a service processing function that needs to be executed, for example, creating (create), modifying (modify), and deploying site (deploy site). In this case, the interface between function modules does not need to transfer an Action parameter. The following uses a site deployment scenario (MO creation is required) as an example for description in FIG. 7A and FIG. 7B. A procedure of the example shown in FIG. 7A and FIG. 7B may include the following steps.

Steps 700 to 703 are similar to step 600 to step 603. For description, refer to the description of step 600 to step 603. Details are not described herein again.

Step 704: The SO invokes a first API, for example, a deploy site API, based on a workflow definition, to initiate a configuration processing procedure, sends a configuration request to the adaptor client, and sends the related parameters in step 700 and step 703 to the adaptor client, including the Parameter list. Optionally, one or more of the following items are further included: Correlation ID, OM IP and port, NRM MO template, Action id, and the southbound interface protocol type.

The interface API invoked in this step is the first interface in the embodiment shown in FIG. 2. In this step, a first interface is a newly defined interface.

When the related parameters include the southbound interface protocol type, the foregoing step is equivalent to a case in which the SO sends the first information to the adaptor client in case a1 in the embodiment shown in FIG. 2.

Step 705: The adaptor client receives a configuration request (for example, a deployment configuration request) of the SO, and selects a corresponding protocol adaptor based on the southbound interface protocol type.

In step 704, if the configuration request includes the southbound interface protocol type, the southbound interface protocol is directly used. If the parameter is not carried, the adaptor client selects the protocol adaptor based on the default priority (a preset southbound interface protocol type) of a protocol type supported by the NE.

Step 706: The adaptor client determines, based on the API type (deploy site is deployment) in step 704 that an object needs to be created, and invokes a second API, for example, a create API, to initiate interface adaptor configuration processing, that is, forwards the configuration request to the selected protocol adaptor.

For example, step 706 is the operation b1 in the embodiment shown in FIG. 2.

The second API is a second interface in the embodiment shown in FIG. 2. In this step, the second interface is a newly defined second interface.

Steps 707 and 708 are similar to step 607 and step 608. For description, refer to the description of step 607 and step 608. Details are not described herein again.

Step 709: The protocol adaptor performs network resource managed object template mapping.

For example, after receiving parameters such as the NRM MO template, the parameter list, and the Action id, the protocol adaptor determines, based on the Action id, a MO type of a network resource object that needs to be operated, and identifies a model attribute of the corresponding MO type based on the NRM MO template, to map the parameter list ("key-value") to MOs, that is, to convert the parameter list to corresponding MO objects and attribute parameters. The adaptor determines, based on the API type in step 706, operation processing for the corresponding MO, for example, Create. If step 700 does not include the Action and the Action id, the protocol adaptor performs default processing, that is, creates all MO objects of the NRM MO template.

Steps 710 to 715 are similar to step 610 to step 615. For description, refer to the description of step 610 to step 615. Details are not described herein again.

Figure 8A:
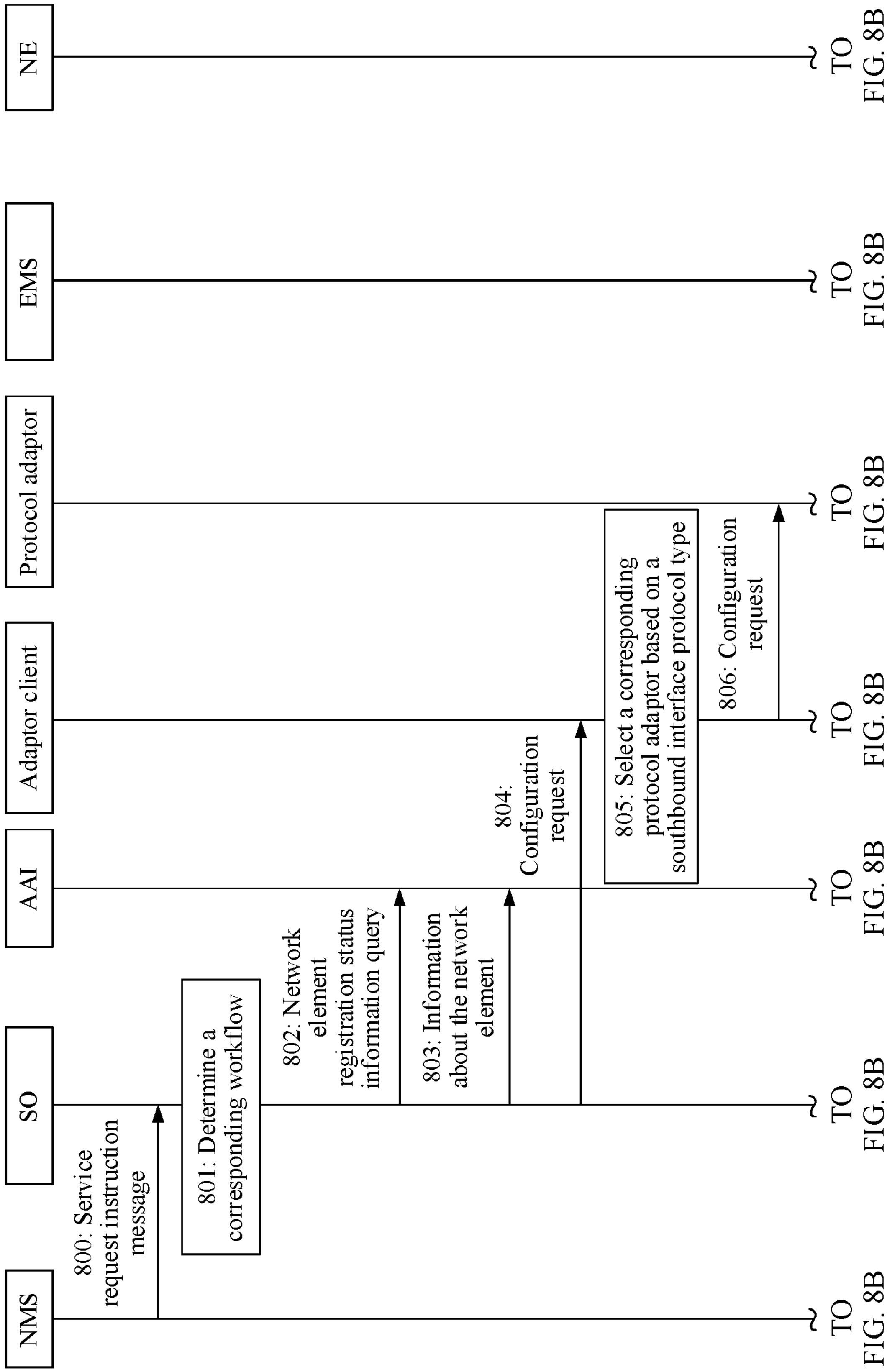
FIG. 8A and FIG. 8B are a flowchart of an example of another communication method according to this application.
Figure 8B:
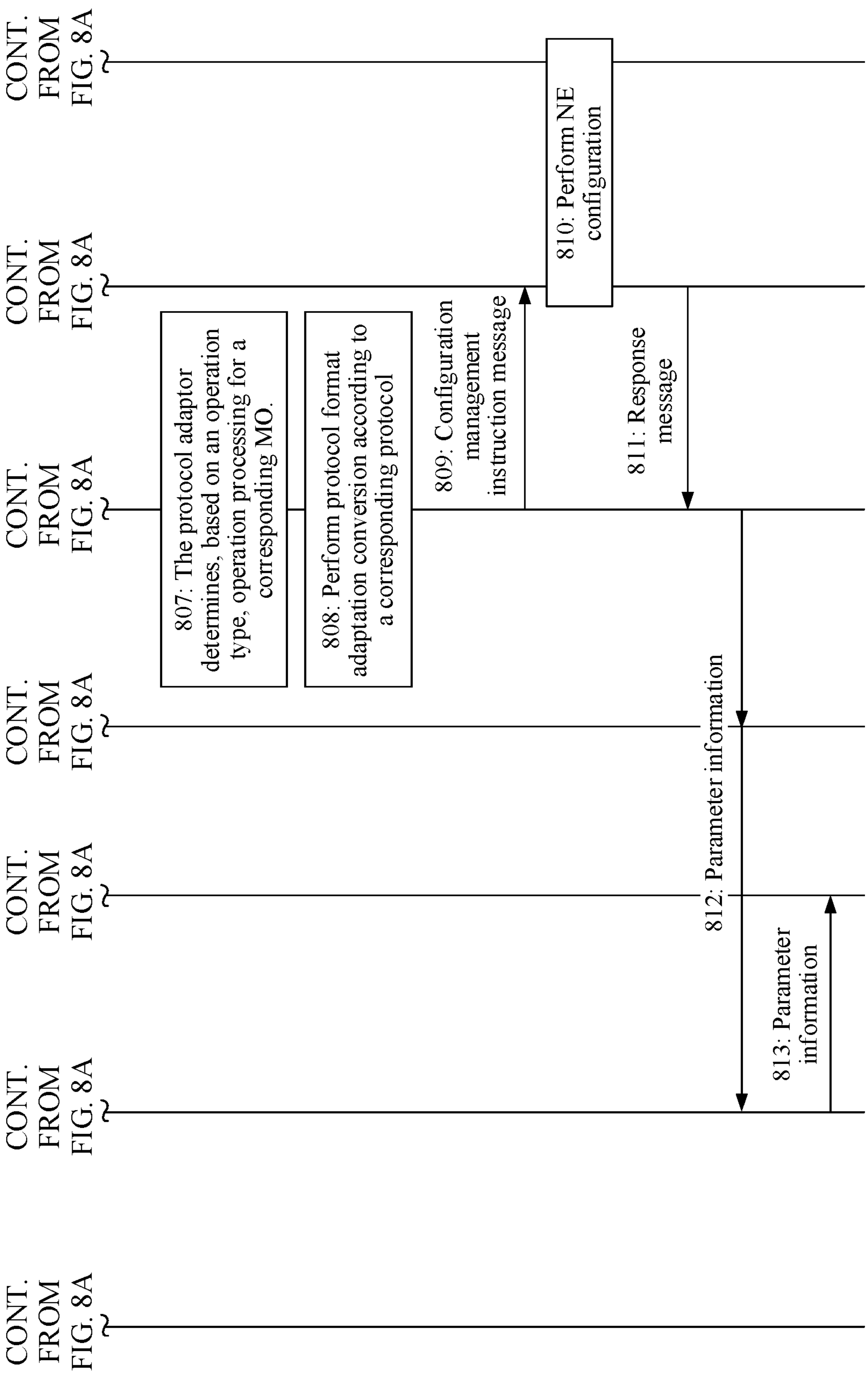

FIG. 8A and FIG. 8B show an example of applying another communication method according to an embodiment of this application. This example scenario is the same as the examples shown in FIG. 6A and FIG. 6B and FIG. 7A and FIG. 7B. In the examples shown in FIG. 6A and FIG. 6B and FIG. 7A and FIG. 7B, in the service request, the NMS needs to indicate, by using Action id, the type of the operation object that needs to be operated. In the example shown in FIG. 8A and FIG. 8B, interface invoking between the SO, the adaptor client, and the protocol adaptor is still the same as the example shown in FIG. 6A and FIG. 6B, and uniformly reuses a Configure API supported in the conventional technology. In addition, the NMS explicitly indicates, in the service request, a managed object MO that needs to be operated and an attribute setting thereof. That is, the NMS does not deliver network element configuration parameters as a parameter list in a "key-value" pair form. Instead, in the NMS, the parameters are mapped into a series of MOs and attribute parameters, and the operation Action for each MO is indicated. In this case, the protocol adaptor does not need to perform managed object MO mapping based on the NRM MO template and does not need to transfer parameters such as the Action id and the NRM MO template on interfaces between function modules. For example, a procedure of the example shown in FIG. 8A and FIG. 8B may include the following steps.

Step 800: An NMS completes network resource managed object mapping processing before a service request, determines a managed object MO that needs to be operated and an attribute parameter thereof, and then the NMS sends a service request instruction message to an SO.

Optionally, the service request instruction message may include the managed object and the attribute parameter (MO and Attributes) thereof, and may further include one or more of Actions for MOs and a southbound interface protocol type. Specifically:

MO and Attributes: a specific network resource managed object to be operated for this service processing (for example, 5G NR MOs: GNBDUFunction, GNBCUFunction, NRCell, and NRCellRelation). Attributes are attribute parameters of each MO; for example, an attribute parameter of a GNBDUFunction MO includes gNBDUId, gNBDUName, gNBId, and gNBIdLength. An attribute parameter of an NRCell MO includes nCI and pLMNIdList.

Actions for MOs: Action list for all MOs. Each MO corresponds to an Action. The value can be Create-MOI, Modify-action, or Delete-action. If the service request instruction message does not carry this parameter, Create-action is executed by default.

The southbound interface protocol type may be CORBA-selected, SOAP-selected, or RESTful-selected. It identifies a southbound interface protocol type that the NMS expects to use. The parameter is used as a reference when an adaptor client selects a protocol adaptor in subsequent procedures. If the service request instruction message does not carry the parameter, the adaptor client selects the protocol adaptor based on the default priority of a protocol type supported by an NE, that is, the adaptor client selects the protocol adaptor based on a predefined southbound interface protocol type.

The Action and the MO are in a one-to-one correspondence. If the service request instruction message involves a plurality of objects, Action of each object needs to be specified.

Step 801: The SO determines, based on the service request (configuration management) of the NMS, a corresponding workflow, to trigger execution of a corresponding service processing procedure.

First, the SO obtains, from the parameter list in step 800, a network element identifier (NE ID) of a network element to which the service request is directed, and initiates a request to the AAI, for querying and determining a registration status of the corresponding NE. The network element may be the first network element in the embodiment shown in FIG. 2 or FIG. 3.

The workflow is a predefined service execution workflow, and may include all function modules that execute the service processing and an execution sequence in which the function modules participate in the service processing. For example, a configuration management workflow is: SO-AAI (execute information query acknowledgment)—adaptor client (execute MO template mapping and adaptor selection)—protocol adaptor (execute interface protocol conversion).

Step 802: The SO sends a network element registration status information query (NE onboarding status check) to the AAI, to query and determine whether the network element to be operated has completed online registration, where the network element registration status information query carries a network element identifier (NE ID).

Step 803: If the queried network element identified by the NE ID does not store corresponding registration information in the AAI, the AAI returns that the network element status is "Unavailable". After receiving the returned message, the SO indicates the NMS that the registration of the corresponding network element is not completed, and the procedure ends. If the queried network element identified by the NE ID has stored the corresponding registration information in the AAI, the AAI returns the information about the network element, including NE ID, Correlation ID, OM IP and port. The Correlation ID is an internal temporary identifier of a PNF allocated by the AAI during PNF registration. OM IP and port are sent to the AAI during PNF registration.

Step 804: The SO invokes a first configure API to initiate a configuration processing procedure, sends a configuration request to the adaptor client, and sends the related parameters in step 800 and step 803 to the adaptor client, including MO and Attributes and Actions for MOs. Optionally, one or more of Correlation ID, OM IP and port, and southbound interface protocol type may be further included.

For example, the first configure API is the first interface in the embodiment shown in FIG. 2. In this step, the first interface is an existing configured interface.

When the related parameters include the southbound interface protocol type, the foregoing step is equivalent to a case in which the SO sends the first information to the adaptor client in case a1 in the embodiment shown in FIG. 2.

Step 805: The adaptor client receives the configuration request of the SO, and selects a corresponding protocol adaptor based on the southbound interface protocol type.

For example, if the configuration request in step 804 includes the southbound interface protocol type, the southbound interface protocol is directly used. If the parameter is not carried, the adaptor client selects the protocol adaptor based on the default priority (a preset southbound interface protocol type) of a protocol type supported by the NE.

The protocol adaptor selected by the adaptor client herein may be the first protocol adaptor in the embodiment shown in FIG. 2 or FIG. 3.

Step 806: The adaptor client invokes a second configure API to initiate interface adaptor configuration processing, that is, forward the configuration request to the selected protocol adaptor.

For example, step 806 is the operation b1 in the embodiment shown in FIG. 2.

The second configure API is the second interface in the embodiment shown in FIG. 2. In this step, the second interface is a reused existing second interface.

Step 807: The protocol adaptor determines, based on an operation type (Action), operation processing for a corresponding MO.

For example, if step 800 does not include the Action, the protocol adaptor performs default processing, that is, creating all MO objects.

Step 808: The protocol adaptor performs protocol format adaptation conversion according to a corresponding protocol, including operation conversion and parameter conversion. For example, a CORBA adaptor converts a Create MO operation into a CORBA creating object operation Create_managed_object. For detailed conversion processing, refer to processing in the existing 3GPP standard. A conversion process is not described in detail in this application.

Step 809: The protocol adaptor invokes a southbound interface API/SB API to send a corresponding configuration management instruction message to an address identified by the OM IP and a port identified by the port.

Step 810: The EMS receives instructions and executes configuration of the NE.

Step 811: After completing configuration management processing of the NE, the EMS returns a response message to the protocol adaptor, and includes the MO and MO attribute parameter that are set by the EMS in the message.

Step 812: After receiving the response message, the protocol adaptor converts the MO and MO attribute parameter that are carried in step 811 into a corresponding "key-value" pair form and sends the MO and MO attribute parameter to the SO through the adaptor client, where the Correlation ID and updated parameters are carried.

Step 813: The SO updates parameter information of the network element (NE) entity stored in the AAI, which carries the Correlation ID and the updated parameters.

Figure 9A:
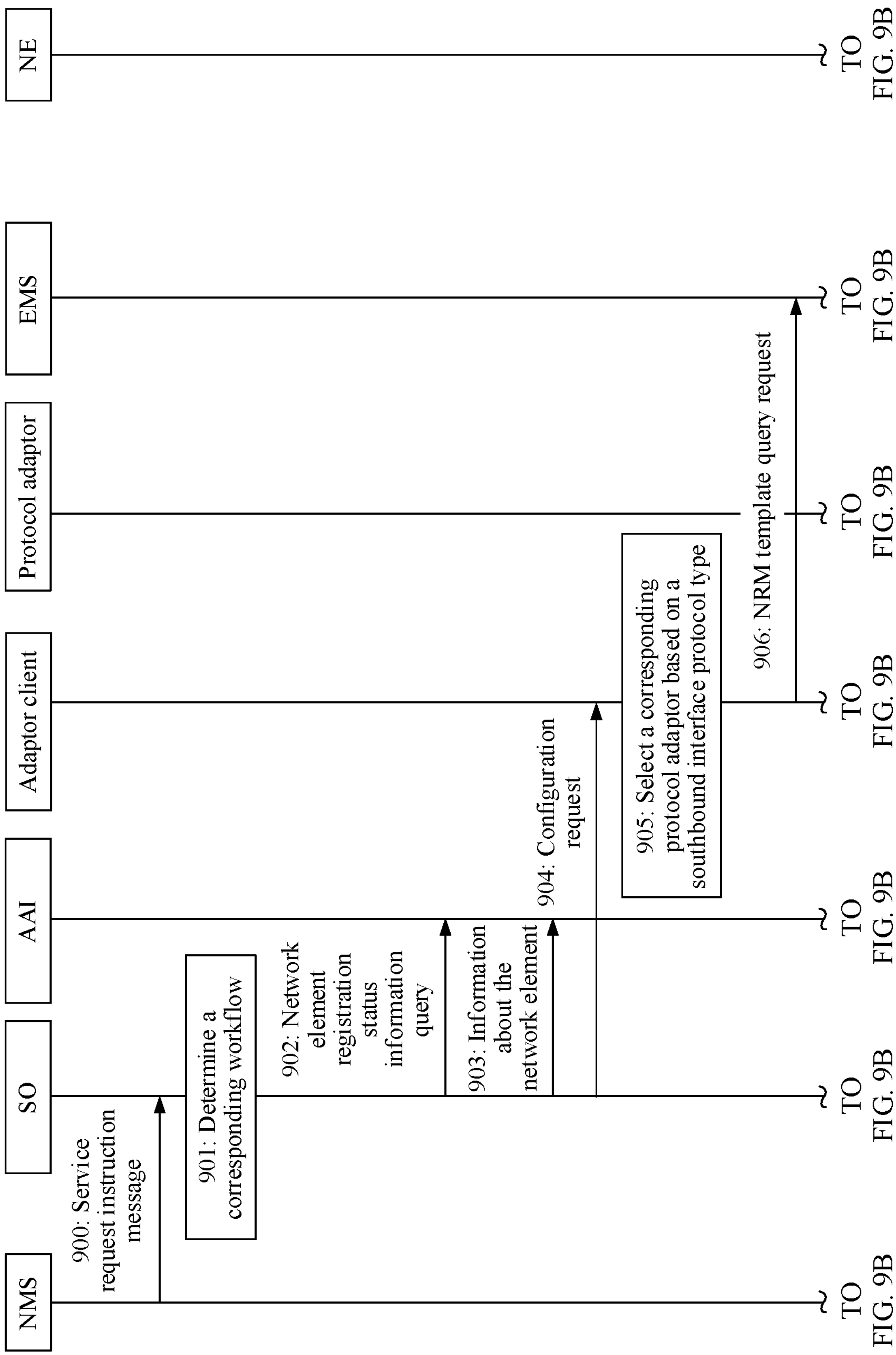
FIG. 9A and FIG. 9B are a flowchart of an example of another communication method according to this application.
Figure 9B:
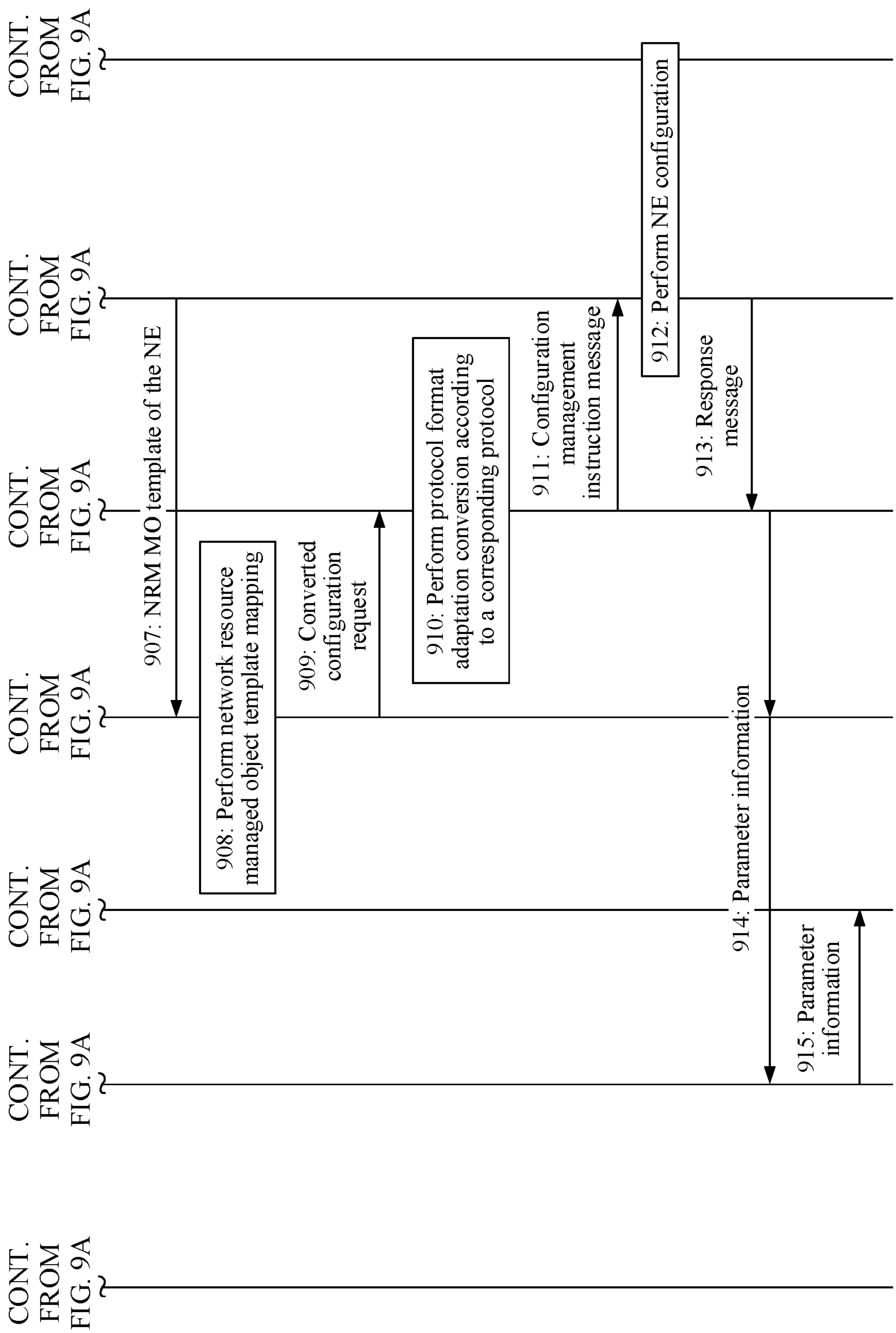

FIG. 9A and FIG. 9B show an example of applying another communication method according to an embodiment of this application. A scenario in this example is the same as the scenario in the example shown in FIG. 6A and FIG. 6B. In the example shown in FIG. 6A and FIG. 6B, NRM MO template mapping processing from the parameter list to the MO is performed by the protocol adaptor, and in the example shown in FIG. 9A and FIG. 9B, the NRM MO template mapping from the parameter list to the MO is performed by the adaptor client. A difference between the example shown in FIG. 9A and FIG. 9B and the example shown in FIG. 6A and FIG. 6B is that function modules that perform the NRM MO template mapping processing are different, and other steps are similar. For example, a procedure of the example shown in FIG. 9A and FIG. 9B may specifically include the following steps.

Steps 900 to 905 are similar to step 600 to step 605. For description, refer to the description of step 600 to step 605. Details are not described herein again.

Step 906: The adaptor client sends an NRM template query request to the EMS/NE, and requests to obtain an NRM MO template supported by the NE, where the request message carries NE ID and NRM version. The NRM version has no actual value and is only a parameter indication that is used to indicate the EMS/NE that the NRM MO template needs to be obtained.

It should be noted that if a device vendor uses a private NRM MO and does not want the ONAP or the like to sense an NRM modeling method of the device vendor, the network device of the device vendor does not register the NRM MO template with the AAI during registration. In this case, if there is no NRM MO template parameter in step 904, the adaptor client needs to perform this step and subsequent step 907.

For example, when an EMS exists in the communication system, the adaptor client sends an NRM template query request to the EMS, and the EMS forwards the NRM template query request to the NE. If no EMS exists in the communication system, the adaptor client directly sends an NRM template query request to the NE.

Step 907: The EMS/NE returns a requested NRM MO template of the NE to the adaptor client, where the returned NRM MO template is a network resource object model corresponding to an NRM modeling method of a corresponding version supported by the NE (for example, a tree structure model, including a plurality of MOs and relationships (such as inheritance) between MOs).

Correspondingly, when an EMS exists in the communication system, the NE sends the NRM MO template to the EMS, and then the EMS forwards the NRM MO template to the adaptor client. If no EMS exists in the communication system, the NE directly sends an NRM MO template to the adaptor client.

Step 908: The adaptor client performs network resource managed object template mapping.

For example, after receiving parameters such as the NRM MO template, the parameter list, and the Action id, the adaptor client determines, based on the Action id, a MO type of a network resource object that needs to be operated, and identifies a model attribute of the corresponding MO type based on the NRM MO template, to map the parameter list ("key-value") to MOs, that is, to convert the parameter list to corresponding MO objects and attribute parameter. The adaptor determines the operation processing for the corresponding MO based on the Action. If step 900 does not include the Action and the Action id, the adaptor client performs default processing, that is, creates all MO objects of the NRM MO template.

Step 909: The adaptor client determines an operation for each MO based on the Action parameter, and directly invokes an interface API provided by a protocol orchestrator to perform the operation for the MO, that is, sends the converted configuration request to the protocol adaptor.

For example, CreateMO, if operations on a plurality of MOs need to be performed, an interface API need to be invoked times/a plurality of interfaces APIs need to be invoked at the same time. If three MOs need to be created, a CreateMO API needs to be invoked three times. If one MO needs to be created and two MOs need to be modified, the CreateMO API needs to be invoked once and a ModifyMO API needs to be invoked twice.

For example, step 909 is the operation b2 in the embodiment shown in FIG. 2.

The interface API provided by the protocol orchestrator is the second interface in the embodiment shown in FIG. 2. In this step, the second interface is a reused existing second interface.

Step 910: The protocol adaptor performs protocol format adaptation conversion according to a corresponding protocol, including operation conversion and parameter conversion. For example, a CORBA adaptor converts a Create MO operation into a CORBA creating object operation Create_managed_object. For detailed conversion processing, refer to processing in the existing 3GPP standard. A conversion process is not described in detail in this application.

Steps 911 and 912 are similar to step 611 and step 612. For description, refer to the description of step 611 and step 612. Details are not described herein again.

Step 913: After completing configuration management processing of the NE, the EMS returns a response message to the protocol adaptor, and includes the MO and MO attribute parameter that are set by the EMS in the message.

Step 914: The protocol adaptor receives the response message, performs corresponding protocol conversion, and returns the MO and attribute parameter of the response message to the adaptor client. After receiving the response message, the adaptor client converts the MO and MO attribute parameter carried in step 913 into a corresponding "key-value" pair form and sends the MO and MO attribute parameter to the SO, where the Correlation ID and updated parameters are carried.

Step 915: The SO updates parameter information of the network element (NE) entity stored in the AAI, which carries the Correlation ID and the updated parameters.

Figure 10A:
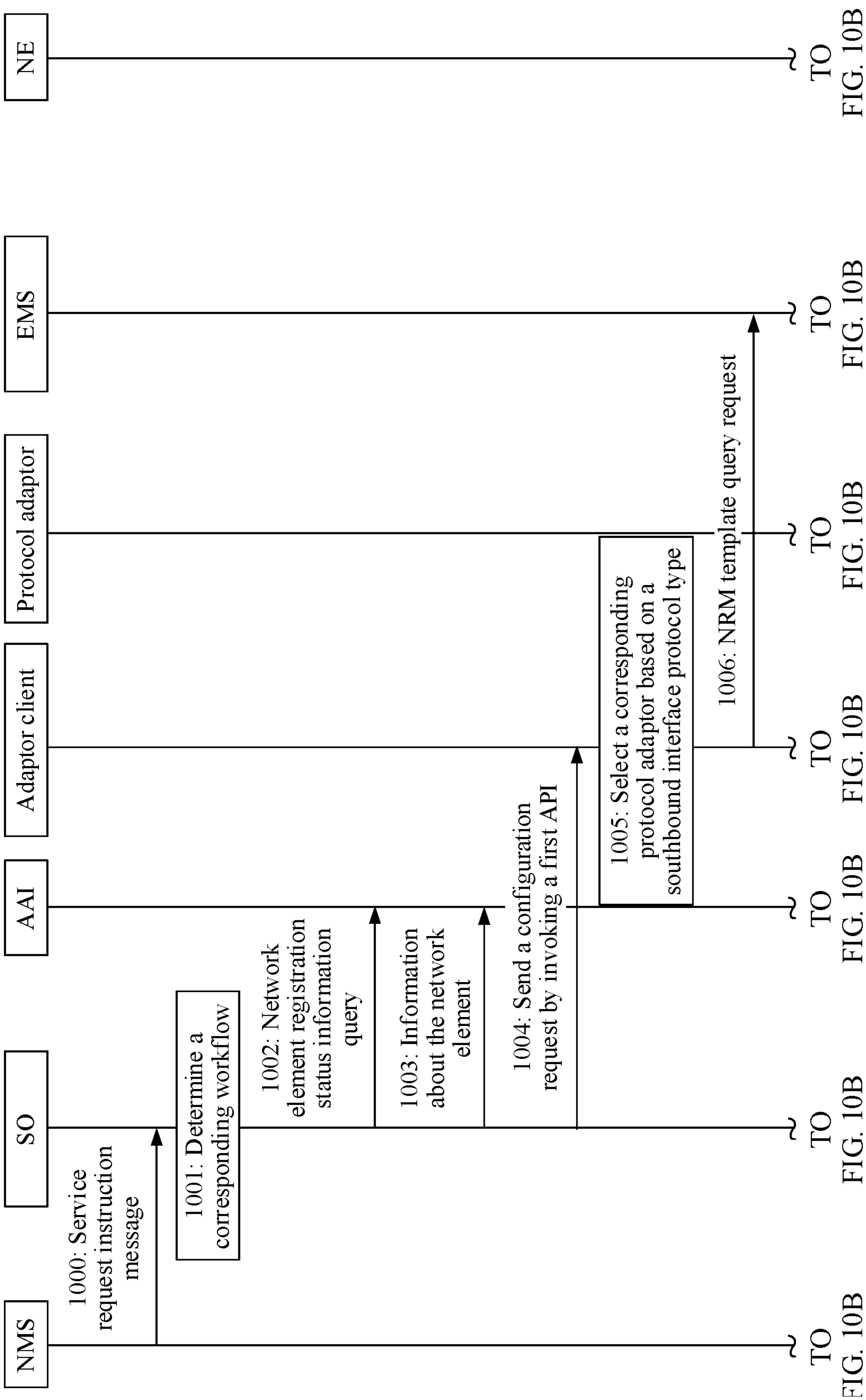
FIG. 10A and FIG. 10B are a flowchart of an example of another communication method according to this application.
Figure 10B:
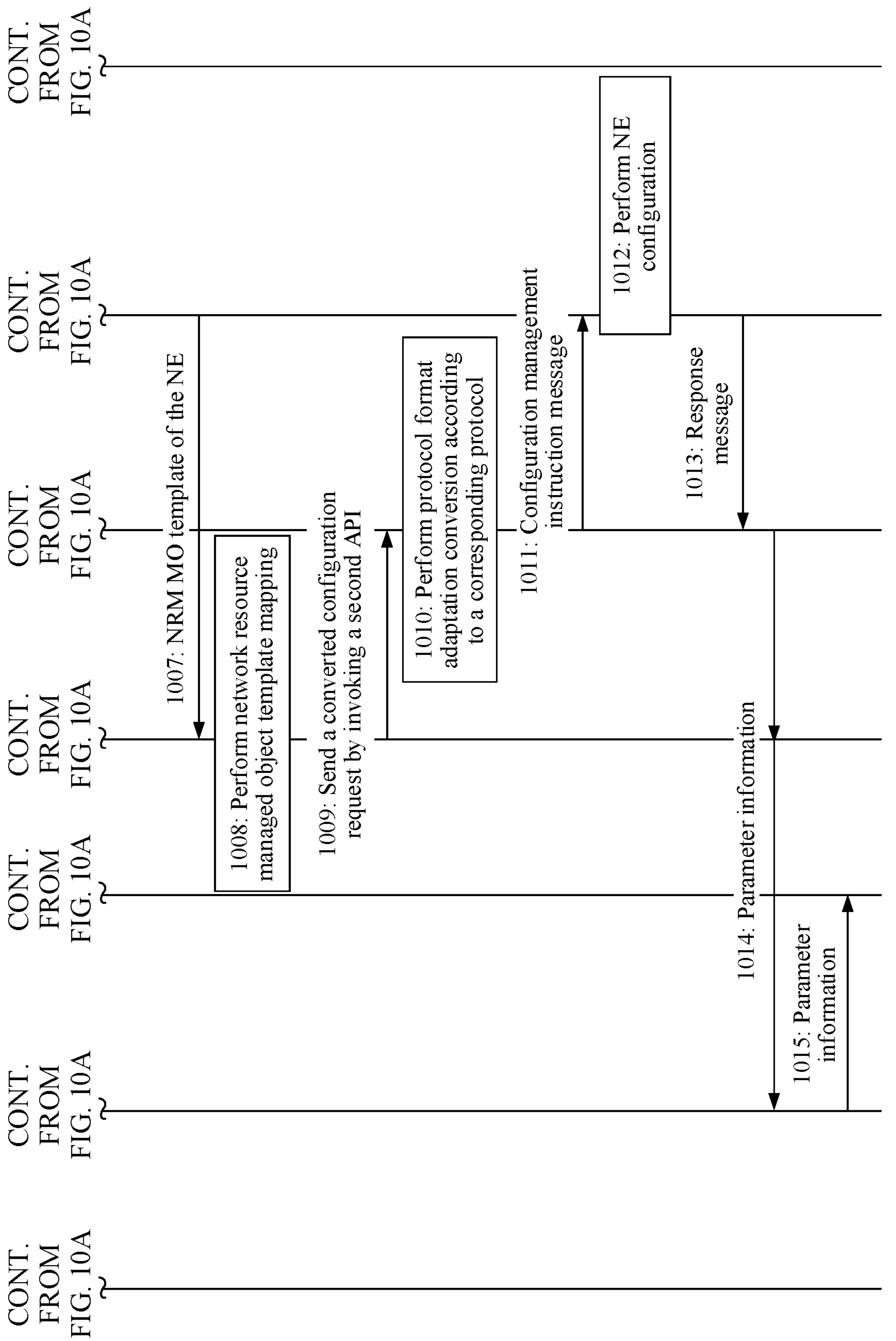

FIG. 10A and FIG. 10B show an example of applying another communication method according to an embodiment of this application. A scenario in this example is the same as the scenario in the example shown in FIG. 9A and FIG. 9B. In the example shown in FIG. 9A and FIG. 9B, interface invocation between the SO and the adaptor client uniformly reuses the Configure API that has been supported in the conventional technology, and the function module identifies a function that needs to be executed based on parsing an Action parameter. In the example shown in FIG. 10A and FIG. 10B, a plurality of different APIs are defined for an interface between SO and adaptor client, and a function module determines, based on an API type, a service processing function that needs to be executed, such as create, modify, and deploy site. In this case, an Action parameter does not need to be transferred on an interface between function modules. For example, the procedure in the example shown in FIG. 10A and FIG. 10B may include the following steps.

Steps 1000 to 1003 are similar to step 900 to step 903. For description, refer to the description of step 900 to step 903. Details are not described herein again.

Step 1004: The SO invokes a first API, for example, a deploy site API, based on a workflow definition, to initiate a configuration processing procedure, sends a configuration request to the adaptor client, and sends the related parameters in step 1000 and step 1003 to the adaptor client, including the Parameter list. Optionally, one or more of the following items may be further included: the Correlation ID, the OM IP and port, the NRM MO template, the Action id, and the southbound interface protocol type.

The interface API invoked in this step is the first interface in the embodiment shown in FIG. 2. In this step, a first interface is a newly defined interface.

Steps 1005 to 1008 are similar to step 905 to step 908. For description, refer to the description of step 905 to step 908. Details are not described herein again.

Step 1009: The adaptor client determines an operation for each MO based on the API type, and directly invokes the second API provided by a protocol orchestrator to perform the operation for the MO, that is, sends the converted configuration request to the protocol adaptor.

For example, CreateMO, if operations on a plurality of MOs need to be performed, an interface API need to be invoked times/a plurality of interfaces APIs need to be invoked at the same time. If three MOs need to be created, a CreateMO API needs to be invoked three times. If one MO needs to be created and two MOs need to be modified, the CreateMO API needs to be invoked once and a ModifyMO API needs to be invoked twice.

For example, step 1009 is the operation b2 in the embodiment shown in FIG. 2.

The interface API provided by the protocol orchestrator is the second interface in the embodiment shown in FIG. 2. In this step, the second interface is a newly defined second interface.

Steps 1010 to 1015 are similar to step 910 to step 915. For description, refer to the description of step 910 to step 915. Details are not described herein again.

Figure 11A:
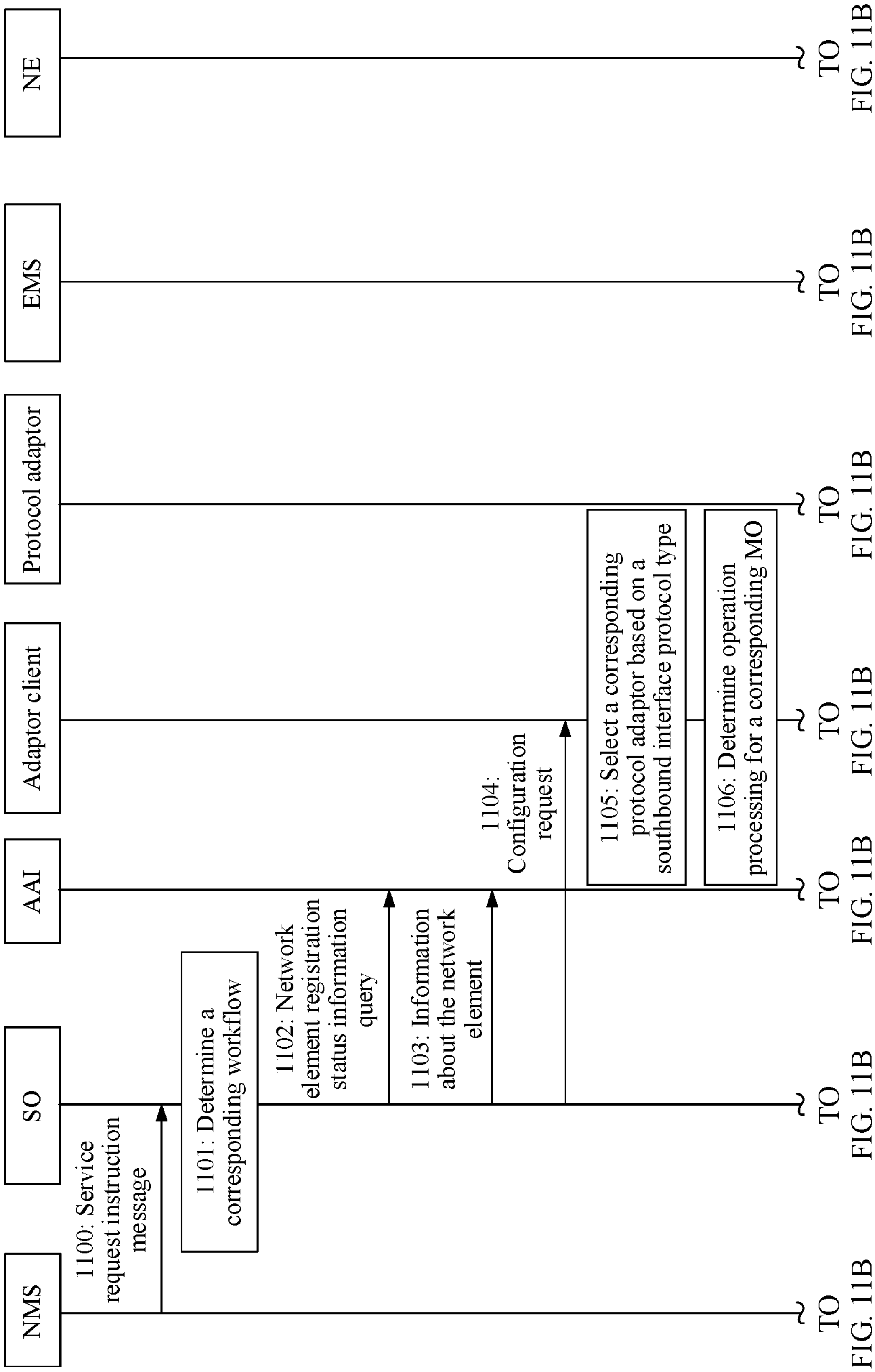
FIG. 11A and FIG. 11B are a flowchart of an example of another communication method according to this application.
Figure 11B:
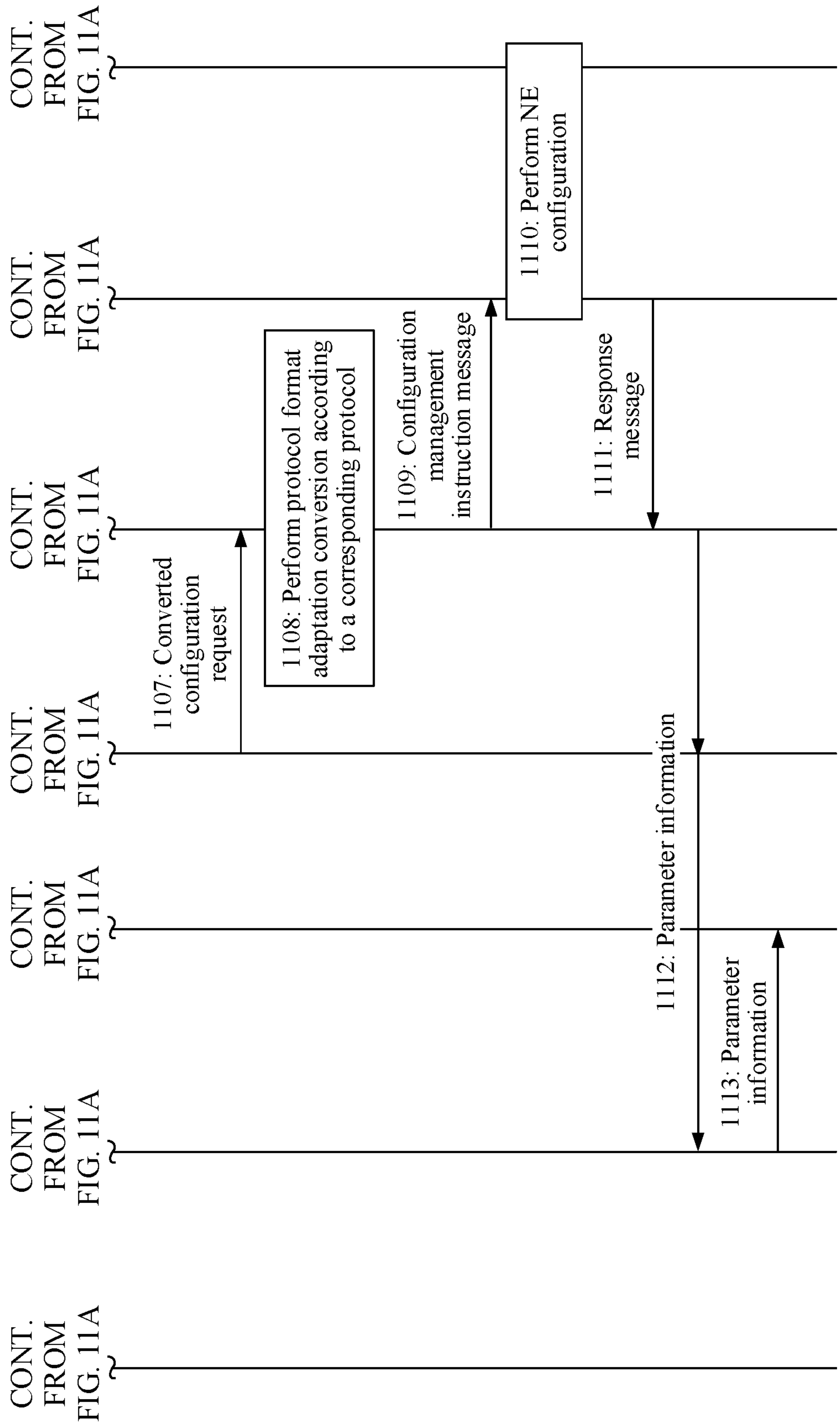

FIG. 11A and FIG. 11B show an example of applying another communication method according to an embodiment of this application. A scenario in this example is the same as the scenarios in the examples shown in FIG. 9A and FIG. 9B and FIG. 10A and FIG. 10B. In the examples shown in FIG. 9A and FIG. 9B and FIG. 10A and FIG. 10B, in the service request, the NMS needs to indicate, by using Action id, the type of the operation object that needs to be operated. In the example shown in FIG. 11A and FIG. 11B, interface invoking between the SO, the adaptor client, and the protocol orchestrator is still the same as the example shown in FIG. 9A and FIG. 9B, and uniformly reuses the Configure API supported in the conventional technology. In addition, the NMS explicitly indicates, in the service request, a managed object MO that needs to be operated and an attribute setting thereof. That is, the NMS does not deliver network element configuration parameters as a parameter list/Parameter list in a "key-value" pair form. Instead, in the NMS, the parameters are mapped into a series of MOs and attribute parameters, and the operation Action for each MO is indicated. In this case, the adaptor client does not need to perform managed object MO mapping based on the NRM MO template and does not need to transfer parameters such as the Action id and the NRM MO template on interfaces between function modules. For example, a procedure of the example shown in FIG. 11A and FIG. 11B may include the following steps.

Steps 1100 to 1105 are similar to step 800 to step 805. For description, refer to the description of step 800 to step 805. Details are not described herein again.

Step 1106: The adaptor client determines, based on Actions for MOs, operation processing for a corresponding MO. If step 1100 does not include the Actions, the adaptor client performs default processing, that is, creating all MO objects.

Steps 1107 to 1113 are similar to step 909 to step 915. For description, refer to the description of step 909 to step 915. Details are not described herein again.

Figure 12:
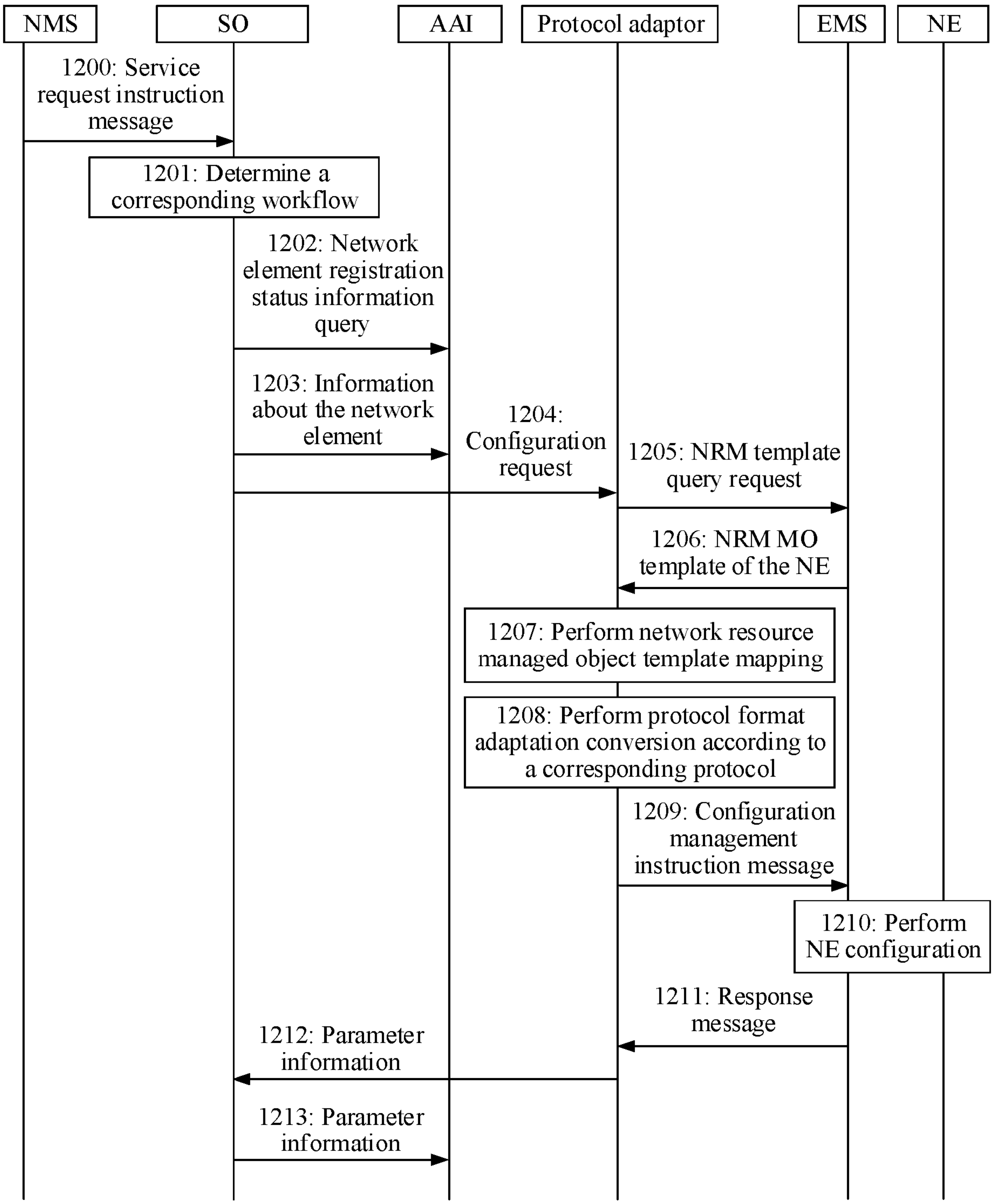
FIG. 12 is a flowchart of an example of another communication method according to this application.

In practice, in a case, there may be only one protocol adaptor in the communication system, and the protocol adaptor can meet a service requirement. In this case, the adaptor client does not need to exist, that is, the adaptor client does not need to select an appropriate protocol adaptor. In this case, the operation related to the protocol client in the foregoing example may be ignored, or may be directly performed by the protocol adaptor. A specific example is used for description. For example, FIG. 12 shows an example of using another communication method according to an embodiment of this application. A specific procedure of the example may include the following steps.

Step 1200: An NMS sends a service request instruction message (service request) to an SO, where the service request instruction message may include a related parameter list, and optionally, may further include one or more of the following: a requested operation type (Action), an operation object (Action id), and a southbound interface protocol type. Specifically:

Action: The value of the Action may be create-action, modify-action, and delete-action. If the service request instruction message does not carry this parameter, the Action is Create-action by default.

The Action id indicates an operation object type of the foregoing Action, and the value may be NEfunction-type, cell-type, cell neighbor relationship type (Cell Relation-type), or the like. If the service request instruction message does not carry the parameter, the foregoing Action is for all operation objects by default. The Action id is defined based on the MO type abstracted in NMR modeling (that is, the MO type defined by the NRM is a value range of the Action id). For example, an NRM MO of 5G NR includes GNBDU-Function, GNBCUFunction, a new radio cell (NRCell), a new radio cell neighbor relationship (NRCellRelation), and the like. The value range of the Action id includes GNBDU-Function-type, GNBCUFunction-type, NRCell-type, NRCellRelation-type, and the like.

The parameter list is parameter data needs to be configured by the NMS, and the parameter list is in a "key-value" pair form. Specifically, the parameter list includes planned configuration data of an operator, such as a network element identifier (NE ID), a cell identifier, a neighbor cell configuration relationship, a frequency setting, a feature ID, and an identifier of a cell where a feature is enabled.

The southbound interface protocol type may be CORBA-selected, SOAP-selected, or RESTful-selected. It identifies a southbound interface protocol type that the NMS expects to use. The parameter is used as a reference when an adaptor client selects a protocol adaptor in subsequent procedures. If the service request instruction message does not carry the parameter, the adaptor client selects the protocol adaptor based on the default priority of a protocol type supported by an NE, that is, the adaptor client selects the protocol adaptor based on a predefined southbound interface protocol type.

The Action and the Action id are in a one-to-one correspondence. If the service request instruction message involves a plurality of operation objects, Action of each type of object is involved.

Step 1201: The SO determines, based on the service request of the NMS, a corresponding workflow, to trigger execution of a corresponding service processing procedure.

First, the SO obtains, from the parameter list in step 600, a network element identifier (NE ID) of a network element to which the service request is directed, and initiates a request to the AAI, for querying and determining a registration status of the corresponding NE. The network element may be the first network element in the embodiment shown in FIG. 2 or FIG. 3.

The workflow is a predefined service execution workflow, and may include all function modules that execute the service processing and an execution sequence in which the function modules participate in the service processing. For example, a configuration management workflow is: SO-AAI (execute information query acknowledgement)—protocol adaptor (execute interface protocol conversion).

Step 1202: The SO sends a network element registration status information query (NE onboarding status check) to the AAI, to query and determine whether the network element to be operated has completed online registration, where the network element registration status information query carries a network element identifier (NE ID).

In an implementation, this step may be further used to query whether a network element (for example, a base station) supports a service feature (for example, an MLB feature), that is, query the AAI to determine whether an attribute of an AAI entity of the corresponding network element includes an MLB-related deployment parameter configuration. If yes, the MLB feature is supported. Otherwise, the feature is not supported.

Step 1203: If the queried network element identified by the NE ID does not store corresponding registration information in the AAI, the AAI returns that the network element status is "unavailable". After receiving the returned message, the SO indicates the NMS that the registration of the corresponding network element is not completed, and the procedure ends. If the queried network element identified by the NE ID has stored the corresponding registration information in the AAI, the AAI returns the information about the network element, including NE ID, Correlation ID, OM IP and port, and NRM MO template. The Correlation ID is an internal temporary identifier of a PNF allocated by the AAI during PNF registration. The OM IP and port and the NRM MO template are sent to the AAI during the PNF registration.

Step 1204: The SO invokes a first configuration application programming interface (configure API) to initiate a configuration processing procedure, sends a configuration request to the protocol adaptor, and sends related parameters in step 1200 and step 1203 to the protocol adaptor, where the related parameters include Parameter list. Optionally, one or more of the following items may be further included: Correlation ID, OM IP and port, NRM MO template, Action, Action id, and a southbound interface protocol type.

Step 1205: The protocol adaptor sends an NRM template query request to the EMS/NE, and requests to obtain an NRM MO template supported by the NE, where the request message carries the NE ID and an NRM version. The NRM version has no actual value and is only a parameter indication that is used to indicate the EMS/NE that the NRM MO template needs to be obtained.

It should be noted that if a device vendor uses a private NRM MO and does not want an ONAP or the like to sense an NRM modeling method of the device vendor, the network device of the device vendor does not register the NRM MO template with the AAI during registration. In this case, if there is no NRM MO template parameter in step 1203, the protocol adaptor needs to perform this step and subsequent step 1206.

For example, when an EMS exists in the communication system, the protocol adaptor sends the NRM template query request to the EMS, and the EMS forwards the NRM template query request to the NE. If no EMS exists in the communication system, the protocol adaptor directly sends the NRM template query request to the NE.

Step 1206: The EMS/NE returns a requested NRM MO template of the NE to the protocol adaptor, where the returned NRM MO template is a network resource object model corresponding to an NRM modeling method of a corresponding version supported by the NE (for example, a tree structure model, including a plurality of MOs and relationships (such as inheritance) between MOs).

Correspondingly, when an EMS exists in the communication system, the NE sends the NRM MO template to the EMS, and then the EMS forwards the NRM MO template to the protocol adaptor. If no EMS exists in the communication system, the NE directly sends the NRM MO template to the protocol adaptor.

Step 1207: The protocol adaptor performs network resource managed object template mapping.

For example, after receiving parameters such as the NRM MO template, the parameter list, and the Action id, the protocol adaptor determines, based on the Action id, a MO type of a network resource object that needs to be operated, and identifies a model attribute of the corresponding MO type based on the NRM MO template, to map the parameter list ("key-value") to MOs, that is, to convert the parameter list to corresponding MO objects and attribute parameters. The protocol adaptor determines operation processing for the corresponding MO based on the Action. If step 1200 does not include the Action and the Action id, the protocol adaptor performs default processing, that is, creates all MO objects of the NRM MO template.

Step 1208: The protocol adaptor performs protocol format adaptation conversion according to a corresponding protocol, including operation conversion and parameter conversion. For example, a CORBA adaptor converts a Create MO operation into a CORBA creating object operation Create_managed_object. For detailed conversion processing, refer to processing in the existing 3GPP standard. A conversion process is not described in detail in this application.

Step 1209: The protocol adaptor invokes a southbound interface API/SB API to send a corresponding configuration management instruction message to an address identified by the OM IP and a port identified by the port.

Step 1210: The EMS receives instructions and executes configuration of the NE.

Step 1211: After completing configuration management processing of the NE, the EMS returns a response message to the protocol adaptor, and includes the MO and MO attribute parameter that are set by the EMS in the message.

Step 1212: After receiving the response message, the protocol adaptor converts the MO and MO attribute parameter that are carried in step 1211 into a corresponding "key-value" pair form and sends the MO and MO attribute parameter to the SO, where the Correlation ID and updated parameters are carried.

Step 1213: The SO updates the parameter information of the network element (NE) entity stored in the AAI, which carries the Correlation ID and the updated parameters.

It should be noted that the example shown in FIG. 12 is merely one specific example when there is only one protocol adaptor in the communication system, and there may be another example. For example, the example may be a variation of the examples in FIG. 6A and FIG. 6B to FIG. 11A and FIG. 11B. Details are not described herein one by one.

In the foregoing embodiments provided in this application, solutions of the communication method provided in some embodiments of this application are separately described from perspectives of function modules or devices and interaction between function modules or devices. It may be understood that, to implement the foregoing functions, each function module or device, for example, the foregoing adaptor client and the first protocol adaptor, includes a corresponding hardware structure and/or software module for performing each function. A person skilled in the art should easily be aware that, in combination with the examples described in the embodiments disclosed in this application, units and algorithm steps may be implemented by hardware or a combination of hardware and computer software in this application. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

For example, when the foregoing function module or the device implements a corresponding function by using a software module, a communication apparatus according to an embodiment of this application may include an obtaining module 1301 and a processing module 1302, and optionally may further include a sending module 1303. For details, refer to a schematic structural diagram shown in FIG. 13. It should be noted that, in this embodiment of this application, when the obtaining module is configured to receive only information or data, the obtaining module may alternatively be a receiving module. When the obtaining module is configured to obtain information or data locally stored in the communication apparatus, the obtaining module may alternatively be a processing module.

Figure 13:
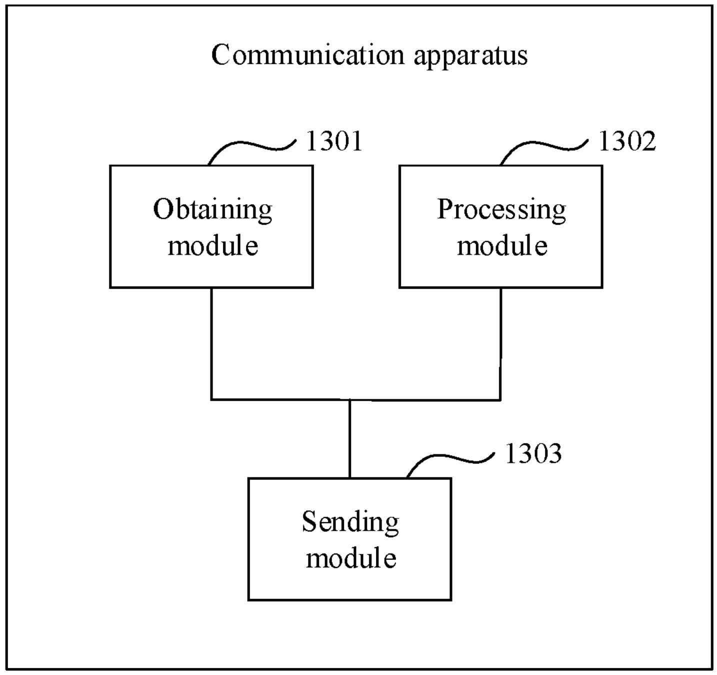
FIG. 13 is a schematic diagram of a structure of a communication apparatus according to this application.

In an embodiment, the communication apparatus shown in FIG. 13 may be configured to perform an operation of the adaptor client in the embodiments shown in FIG. 2 to FIG. 4 and FIG. 6A and FIG. 6B to FIG. 11A and FIG. 11B. For example:

The obtaining module 1301 is configured to obtain a southbound interface protocol type. The adaptor client is configured to manage two or more protocol adaptors.

The processing module 1302 is configured to select a first protocol adaptor from the two or more protocol adaptors based on the southbound interface protocol type, where the first protocol adaptor is configured to implement a first protocol.

In an optional implementation, when obtaining the southbound interface protocol type, the obtaining module 1301 is specifically configured to receive first information from a service orchestrator, where the first information is used to request to perform network configuration for a first network element, the first information is a configuration parameter in a key-value pair form, and the first information includes the southbound interface protocol type; obtain the southbound interface protocol type from the first information; or obtain a preset southbound interface protocol type.

In an example, when receiving the first information from the service orchestrator, the obtaining module 1301 is specifically configured to receive, from the service orchestrator, the first information sent by the service orchestrator by invoking a first interface, where the first interface is provided by the adaptor client.

In a possible implementation, the communication apparatus further includes the sending module 1303.

The sending module 1303 is configured to: after the obtaining module receives the first information from the service orchestrator, send the first information to the first protocol adaptor. Alternatively, the processing module 1302 is further configured to determine second information based on the first information. The sending module 1303 is configured to send the second information to the first protocol adaptor, where the second information is a managed object and an object attribute thereof, and the second information is obtained by mapping the first information based on a network resource managed object template.

In an example implementation, when sending the first information to the first protocol adaptor, the sending module 1303 is specifically configured to: invoke a second interface provided by the first protocol adaptor to send the first information to the first protocol adaptor.

In an example implementation, when sending the second information to the first protocol adaptor, the sending module 1303 is specifically configured to: invoke the second interface provided by the first protocol adaptor to send the second information to the first protocol adaptor.

For example, the sending module 1303 is further configured to send a network resource model template query request to the first network element. The obtaining module 1301 is further configured to receive a network resource object model of the first network element from the first network element.

For example, the obtaining module 1301 is further configured to receive third information from the first protocol adaptor, where the third information includes a name, an identifier, and a supported protocol type of the first protocol adaptor. The processing module 1302 is further configured to create context information locally on the adaptor client based on the third information. The sending module 1303 is further configured to send fourth information to the first protocol adaptor, where the fourth information is used to indicate a registration result to the first protocol adaptor.

For example, the first protocol adaptor is a CORBA adaptor, a SOAP adaptor, a RESTful adaptor, or the like.

For another example, when the foregoing function module or the device implements a corresponding function by using a software module, a communication apparatus according to an embodiment of this application may further include a receiving module 1401, a processing module 1402, and a sending module 1403. For details, refer to a schematic structural diagram shown in FIG. 14.

Figure 14:
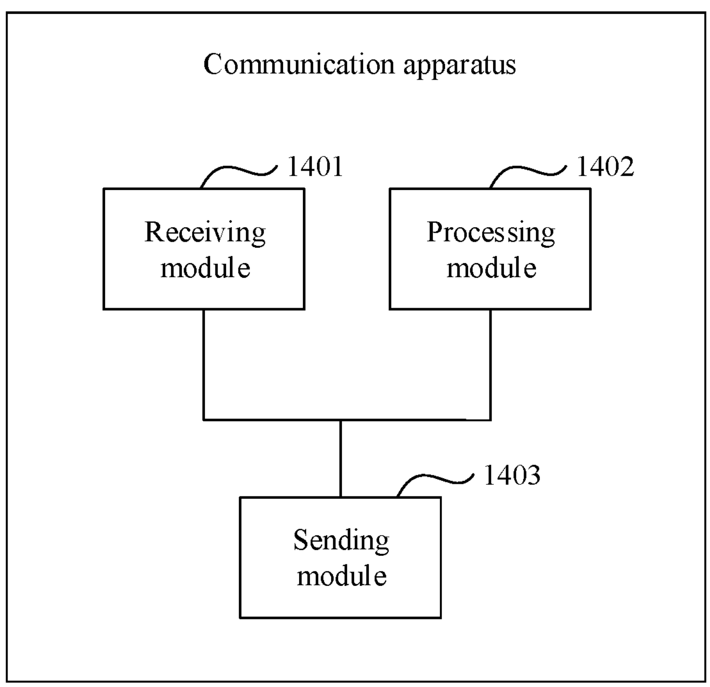
FIG. 14 is a schematic diagram of a structure of another communication apparatus according to this application.

In an embodiment, the communication apparatus shown in FIG. 14 may be configured to perform an operation of the first protocol adaptor in the embodiments shown in FIG. 2 and FIG. 3, and may be configured to perform an operation of the protocol adaptor in the embodiments shown in FIG. 4 and FIG. 6A and FIG. 6B to FIG. 12. For example:

The receiving module 1401 is configured to receive first information, where the first information is a configuration parameter in a key-value pair form. The first information is a configuration parameter used to perform network configuration for the first network element. The first protocol adaptor is configured to implement a first protocol.

The processing module 1402 is configured to determine second information based on the first information, where the second information is a managed object and an object attribute thereof. The second information is obtained by mapping the first information based on a network resource managed object template.

The sending module 1403 is configured to send the second information to the first network element.

For example, when receiving the first information, the receiving module 1401 is specifically configured to: receive the first information from an adaptor client, where the adaptor client is configured to manage two or more protocol adaptors; or receive the first information from a service orchestrator.

In an optional implementation, when receiving the first information from the adaptor client, the receiving module 1401 is specifically configured to: receive the first information sent by the adaptor client by invoking a second interface, where the second interface is provided by the first protocol adaptor.

In another optional implementation, when receiving the first information from the service orchestrator, the receiving module 1401 is specifically configured to: receive the first information sent by the service orchestrator by invoking the second interface.

For example, the sending module 1403 is further configured to send a network resource model template query request to the first network element. The receiving module 1401 is further configured to receive a network resource object model of the first network element from the first network element.

In a possible example, the sending module 1403 is further configured to send third information to the adaptor client, where the third information includes a name, an identifier, and a supported protocol type of the first protocol adaptor. The receiving module 1401 is further configured to receive fourth information from the adaptor client, where the fourth information is used to indicate a registration result to the first protocol adaptor.

For example, the first protocol adaptor may be a CORBA adaptor, a SOAP adaptor, a RESTful adaptor, or the like.

It should be noted that, division into units or modules in the embodiments of this application is an example, and is merely logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods that are in the embodiments of this application. The foregoing storage medium includes any medium, for example, a USB flash drive, a removable hard disk, a read-only memory (ROM), a random access memory (RAAI), a magnetic disk, or an optical disc, that can store program code.

For another example, when the foregoing function module or the device implements a corresponding function by using hardware, the communication apparatus according to this application may include a communication interface 1501 and a processor 1502, and optionally may further include a memory 1503. For details, refer to a structural diagram shown in FIG. 15.

For example, the processor 1502 may be a central processing unit (CPU), a network processor (NP), a combination of a CPU and an NP, or the like. The processor 1502 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 1502 may implement the foregoing functions by hardware or certainly by hardware executing corresponding software.

The communication interface 1501 and the processor 1502 are connected to each other. Optionally, the communication interface 1501 and the processor 1502 are connected to each other by using a bus 1504. The bus 1504 may be a peripheral component interconnect (PCI) bus, an extended industry standard architecture (EISA) bus, or the like. Buses may be classified into an address bus, a data bus, a control bus, and the like. For ease of representation, only one thick line is used to represent the bus in FIG. 15, but this does not mean that there is only one bus or only one type of bus.

The memory 1503 is coupled to the processor 1502, and is configured to store a program and the like that are necessary for the communication apparatus. For example, the program may include program code, and the program code includes computer operation instructions. The memory 1503 may include a RAAI, or may further include a non-volatile memory, for example, at least one magnetic disk memory. The processor 1502 executes an application program stored in the memory 1503, to implement a function of the communication apparatus.

Figure 15:
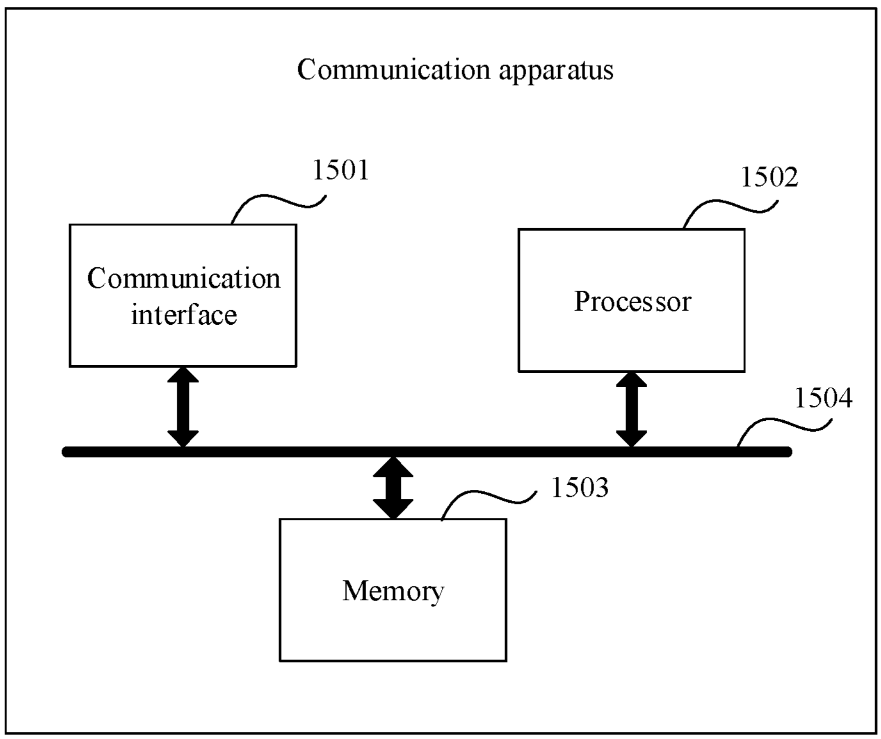
FIG. 15 is a diagram of a structure of a communication apparatus according to this application.

In an embodiment, the communication apparatus shown in FIG. 15 may be configured to perform an operation of the adaptor client in the embodiments shown in FIG. 2 to FIG. 4 and FIG. 6A and FIG. 6B to FIG. 11A and FIG. 11B. For example:

The communication interface 1501 is configured to obtain a southbound interface protocol type. The adaptor client is configured to manage two or more protocol adaptors.

The processor 1502 is configured to select a first protocol adaptor from the two or more protocol adaptors based on the southbound interface protocol type, where the first protocol adaptor is configured to implement a first protocol.

In an optional implementation, when obtaining the southbound interface protocol type, the communication interface 1501 is specifically configured to:

receive first information from a service orchestrator, where the first information is used to request to perform network configuration for a first network element, the first information is a configuration parameter in a key-value pair form, and the first information includes the southbound interface protocol type; obtain the southbound interface protocol type from the first information; or obtain a preset southbound interface protocol type.

In an example, when receiving the first information from the service orchestrator, the communication interface 1501 is specifically configured to:

receive, from the service orchestrator, the first information sent by the service orchestrator by invoking a first interface, where the first interface is provided by the adaptor client.

In a possible implementation, the communication interface 1501 is further configured to: after receiving the first information from the service orchestrator, send the first information to the first protocol adaptor. Alternatively, the processor 1502 is further configured to determine second information based on the first information. The communication interface 1501 is further configured to send the second information to the first protocol adaptor, where the second information is a managed object and an object attribute thereof, and the second information is obtained by mapping the first information based on a network resource managed object template.

In an example implementation, when sending the first information to the first protocol adaptor, the communication interface 1501 is specifically configured to invoke a second interface provided by the first protocol adaptor to send the first information to the first protocol adaptor.

In an example implementation, when sending the second information to the first protocol adaptor, the communication interface 1501 is specifically configured to invoke a second interface provided by the first protocol adaptor to send the second information to the first protocol adaptor.

For example, the communication interface 1501 is further configured to: send a network resource model template query request to the first network element, and receive a network resource object model of the first network element from the first network element.

For example, the communication interface 1501 is further configured to receive third information from the first protocol adaptor, where the third information includes a name, an identifier, and a supported protocol type of the first protocol adaptor. The processor 1502 is further configured to create context information locally on the adaptor client based on the third information. The communication interface 1501 is further configured to send fourth information to the first protocol adaptor, where the fourth information is used to indicate a registration result to the first protocol adaptor.

For example, the first protocol adaptor may be a CORBA adaptor, a SOAP adaptor, a RESTful adaptor, or the like.

In another embodiment, the communication apparatus shown in FIG. 15 may be configured to perform an operation of the first protocol adaptor in the embodiments shown in FIG. 2 and FIG. 3, and may be configured to perform an operation of the protocol adaptor in the embodiments shown in FIG. 4 and FIG. 6A and FIG. 6B to FIG. 12. For example:

The communication interface 1501 is configured to receive first information, where the first information is a configuration parameter in a key-value pair form. The first information is a configuration parameter used to perform network configuration for a first network element, and the first protocol adaptor is configured to implement a first protocol.

The processor 1502 is configured to determine second information based on the first information, where the second information is a managed object and an object attribute thereof. The second information is obtained by mapping the first information based on a network resource managed object template.

The communication interface 1501 is further configured to send the second information to the first network element.

For example, when receiving the first information, the communication interface 1501 is specifically configured to: receive the first information from an adaptor client, where the adaptor client is configured to manage two or more protocol adaptors; or receive the first information from the service orchestrator.

In an optional implementation, when receiving the first information from the adaptor client, the communication interface 1501 is specifically configured to: receive the first information sent by the adaptor client by invoking a second interface, where the second interface is provided by the first protocol adaptor.

In another optional implementation, when receiving the first information from the service orchestrator, the communication interface 1501 is specifically configured to: receive the first information sent by the service orchestrator by invoking the second interface.

For example, the communication interface 1501 is further configured to: send a network resource model template query request to the first network element, and receive a network resource object model of the first network element from the first network element.

In a possible example, the communication interface 1501 is further configured to send third information to the adaptor client, where the third information includes a name, an identifier, and a supported protocol type of the first protocol adaptor. The communication interface 1501 is further configured to receive fourth information from the adaptor client, where the fourth information is used to indicate a registration result to the first protocol adaptor.

For example, the first protocol adaptor may be a CORBA adaptor, a SOAP adaptor, a RESTful adaptor, or the like.

Persons skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Definitely, a person skilled in the art can make various modifications and variations to the embodiments of this application without departing from the scope of the embodiments of this application. In this way, this application is intended to cover these modifications and variations of the embodiments of this application provided that they fall within the scope of protection defined by the following claims and their equivalent technologies.

What is claimed is:

1. A communication method, comprising:

obtaining, by an adaptor client, a southbound interface protocol type, wherein the adaptor client manages two or more protocol adaptors, wherein the obtaining the southbound interface protocol type comprises:

receiving, by the adaptor client, first information from a service orchestrator, wherein the first information requests to perform network configuration for a first network element, the first information comprises a configuration parameter in a key-value pair form, the first information comprises the southbound interface protocol type, and the configuration parameter in the key-value pair form comprises a correlation identifier (ID), and the correlation ID is an internal temporary identifier that is of a physical network function (PNF) A and that is allocated when the PNF is registered; and obtaining, by the adaptor client, the southbound interface protocol type from the first information; and selecting, by the adaptor client, a first protocol adaptor from the two or more protocol adaptors based on the southbound interface protocol type, wherein the first protocol adaptor implements a first protocol.

2. The method according to claim 1, wherein the receiving, by the adaptor client, first information from a service orchestrator comprises:

receiving, by the adaptor client from the service orchestrator, the first information by invoking a first interface, wherein the first interface is provided by the adaptor client.

3. The method according to claim 1, wherein after the receiving, by the adaptor client, first information from a service orchestrator, the method further comprises:

sending, by the adaptor client, the first information to the first protocol adaptor; or determining, by the adaptor client, second information based on the first information, and sending the second information to the first protocol adaptor, wherein the second information comprises a managed object and an object attribute associated with the managed object, and the second information is obtained by mapping the first information based on a network resource managed object template.

4. The method according to claim 3, wherein:

the sending, by the adaptor client, the first information to the first protocol adaptor comprises sending, by the adaptor client, the first information to the first protocol adaptor by invoking a second interface provided by the first protocol adaptor; or the sending, by the adaptor client, the second information to the first protocol adaptor comprises sending, by the adaptor client, the second information to the first protocol adaptor by invoking a second interface provided by the first protocol adaptor.

5. The method according to claim 3, wherein the method further comprises:

sending, by the adaptor client, a network resource model template query request to the first network element; and receiving a network resource object model of the first network element from the first network element.

6. The method according to claim 1, wherein the method further comprises:

receiving, by the adaptor client, third information from the first protocol adaptor, wherein the third information comprises a name, an identifier, and a supported protocol type of the first protocol adaptor;

creating, by the adaptor client, context information locally on the adaptor client based on the third information; and sending, by the adaptor client, fourth information to the first protocol adaptor, wherein the fourth information notifies the first protocol adaptor of a registration result.

7. The method according to claim 1, wherein the first protocol adaptor is a common object request broker architecture (CORBA) adaptor, a simple object access protocol (SOAP) adaptor, or a representational state transfer (RESTful) adaptor.

8. A communication method, comprising:

receiving, by a first protocol adaptor, first information, wherein the first information comprises a configuration parameter in a key-value pair form, the first information is used to perform network configuration for a first network element, and the first protocol adaptor implements a first protocol, and wherein the configuration parameter in the key-value pair form comprises a correlation identifier (ID), and the correlation ID is an internal temporary identifier that is of a physical network function (PNF) A and that is allocated when the PNF is registered;

determining, by the first protocol adaptor, second information based on the first information, wherein the second information comprises a managed object and an object attribute associated with the managed object, and the second information is obtained by mapping the first information based on a network resource managed object template; and sending, by the first protocol adaptor, the second information to the first network element.

9. The method according to claim 8, wherein the receiving, by a first protocol adaptor, first information comprises:

receiving, by the first protocol adaptor, the first information from an adaptor client, wherein the adaptor client manages two or more protocol adaptors; or receiving, by the first protocol adaptor, the first information from a service orchestrator.

10. The method according to claim 9, wherein:

the receiving, by the first protocol adaptor, the first information from an adaptor client comprises receiving, by the first protocol adaptor, the first information sent by the adaptor client by invoking a second interface, wherein the second interface is provided by the first protocol adaptor; or the receiving, by the first protocol adaptor, the first information from a service orchestrator comprises receiving, by the first protocol adaptor, the first information sent by the service orchestrator by invoking a second interface.

11. The method according to claim 8, wherein the method further comprises:

sending, by the first protocol adaptor, a network resource model template query request to the first network element; and receiving a network resource object model of the first network element from the first network element.

12. The method according to claim 8, wherein the method further comprises:

sending, by the first protocol adaptor, third information to an adaptor client, wherein the third information comprises a name, an identifier, and a supported protocol type of the first protocol adaptor; and receiving, by the first protocol adaptor, fourth information from the adaptor client, wherein the fourth information notifies the first protocol adaptor of a registration result.

13. The method according to claim 8, wherein the first protocol adaptor is a common object request broker architecture (CORBA) adaptor, a simple object access protocol (SOAP) adaptor, or a representational state transfer (RESTful) adaptor.

14. A communication apparatus, wherein the communication apparatus is an adaptor client, and wherein the communication apparatus comprises:

at least one processor; and one or more memories coupled to the at least one processor and storing programming instructions for execution by the at least one processor to:

obtain a southbound interface protocol type, wherein the adaptor client manages two or more protocol adaptors, wherein the obtain the southbound interface protocol type comprises:

receive first information from a service orchestrator, wherein the first information requests to perform network configuration for a first network element, the first information comprises a configuration parameter in a key-value pair form, the first information comprises the southbound interface protocol type, and the configuration parameter in the key-value pair form comprises a correlation identifier (ID), and the correlation ID is an internal temporary identifier that is of a physical network function (PNF) A and that is allocated when the PNF is registered; and obtain the southbound interface protocol type from the first information; and select a first protocol adaptor from the two or more protocol adaptors based on the southbound interface protocol type, wherein the first protocol adaptor implements a first protocol.

15. The communication apparatus according to claim 14, wherein the programming instructions are for execution by the at least one processor to:

receive, from the service orchestrator, the first information by invoking a first interface, wherein the first interface is provided by the adaptor client.

16. The communication apparatus according to claim 14, wherein the programming instructions are for execution by the at least one processor to:

send the first information to the first protocol adaptor after receiving the first information from the service orchestrator; or determine second information based on the first information, and send the second information to the first protocol adaptor, wherein the second information comprises a managed object and an object attribute associated with the managed object, and the second information is obtained by mapping the first information based on a network resource managed object template.

17. The communication apparatus according to claim 16, wherein the programming instructions are for execution by the at least one processor to:

send the first information to the first protocol adaptor by invoking a second interface provided by the first protocol adaptor; or send the second information to the first protocol adaptor by invoking a second interface provided by the first protocol adaptor.

18. The communication apparatus according to claim 16, wherein the programming instructions are for execution by the at least one processor to:

send a network resource model template query request to the first network element; and receive a network resource object model of the first network element from the first network element.

19. The communication apparatus according to claim 14, wherein the programming instructions are for execution by the at least one processor to:

receive third information from the first protocol adaptor, wherein the third information comprises a name, an identifier, and a supported protocol type of the first protocol adaptor;

create context information locally on the adaptor client based on the third information; and send fourth information to the first protocol adaptor, wherein the fourth information notifies the first protocol adaptor of a registration result.

20. The communication apparatus according to claim 14, wherein the first protocol adaptor is a common object request broker architecture (CORBA) adaptor, a simple object access protocol (SOAP) adaptor, or a representational state transfer (RESTful) adaptor.

* * * * *